United States Patent [19]

Shorey

[11] 4,039,163

[45] Aug. 2, 1977

[54] AIRCRAFT CARGO RAMP

[75] Inventor: Thomas H. Shorey, Freeland, Wash.

[73] Assignee: The Boeing Company, Seattle, Wash.

[21] Appl. No.: 673,917

[22] Filed: Apr. 5, 1976

[51] Int. Cl.² .............................................. B64D 9/00
[52] U.S. Cl. .................................. 244/137 R; 14/71.5;
193/35 SS; 193/35 C; 198/865; 214/84;
214/85; 244/129.6
[58] Field of Search ............ 244/118 R, 118 P, 129 S,
244/137 R, 137 P; 214/84, 85, 85.1, 103;
14/71.1, 71.3, 71.5, 71.7; 182/99; 193/35 R,
35 S, 35 J, 35 C, 35 SS, 38; 198/204

[56] References Cited

U.S. PATENT DOCUMENTS

| 498,649 | 5/1893 | Hallock | 193/35 R |
|---|---|---|---|
| 2,323,279 | 6/1943 | Van Zelm | 244/118 R |
| 2,392,557 | 1/1946 | Smith et al. | 214/103 |
| 2,414,447 | 1/1947 | Cargile | 214/85 |
| 2,523,723 | 9/1950 | Santee et al. | 214/85 |
| 2,801,730 | 8/1957 | Strickler | 198/204 |
| 2,815,111 | 12/1957 | Capps et al. | 193/35 C |
| 2,846,092 | 8/1958 | Garnett | 214/85 |
| 2,942,812 | 6/1960 | Pauli | 244/118 R |
| 3,002,719 | 10/1961 | Weiland et al. | 244/137 R |
| 3,128,068 | 4/1964 | Pauli | 244/137 R |
| 3,176,334 | 4/1965 | Loudahl | 182/97 |
| 3,203,527 | 8/1965 | Daetwyler | 193/35 SS |
| 3,290,710 | 12/1966 | Whitewack | 14/71.7 |
| 3,544,046 | 12/1970 | Belolipetsky et al. | 244/137 R |
| 3,679,081 | 7/1972 | Duncan | 214/85 |
| 3,711,882 | 1/1973 | Iller | 14/72 |
| 3,799,479 | 3/1974 | Roeder et al. | 244/137 R |
| 3,836,101 | 9/1974 | Mattia et al. | 244/137 R |
| 3,879,784 | 4/1975 | Kummerman | 14/71.1 |
| 3,941,337 | 3/1976 | Mölter et al. | 244/129 S |

FOREIGN PATENT DOCUMENTS 833,730   4/1960   United Kingdom ............ 244/129 S Primary Examiner—Trygve M. Blix
Assistant Examiner—Galen L. Barefoot
Attorney, Agent, or Firm—Christensen, O'Connor, Garrison & Havelka

[57] ABSTRACT

A cargo ramp stowable within the cargo compartment of an aircraft and deployable between the sill region of the aircraft cargo opening and the surface of the ground is disclosed. The cargo ramp, which is arranged for ease of deployment and stowage, includes three hinged together ramp sections with the upper surface of each ramp section including track regions suitable for supporting wheeled vehicular cargo. The cargo ramp is stowed within the aircraft cargo compartment in a folded position with the lower cargo ramp section extending along the upper surface of the other two ramp sections. Each hinged portion of the cargo ramp is power actuated such that the cargo ramp sections can be readily swung together during a deployment sequence which utilizes the aircraft cargo roller system and a first deployment assembly that is mounted on the upper cargo ramp terminus. This deployment assembly includes rollers that are engagable with guide channels mounted on the floor of the aircraft cargo compartment. A power actuated locking mechanism securely fastens the cargo ramp sections together when the cargo ramp is fully deployed. A second deployment assembly, located along each side of the cargo ramp near the upper ramp terminus, securely attaches the cargo ramp to the aircraft sill fittings. Deployable guide rails and rollers facilitate the handling of cargo packed on pallets or other general cargo such as crates with the guide rails being deployable to establish two effective ramp widths for accommodating two standard sized cargo pallets.

23 Claims, 19 Drawing Figures

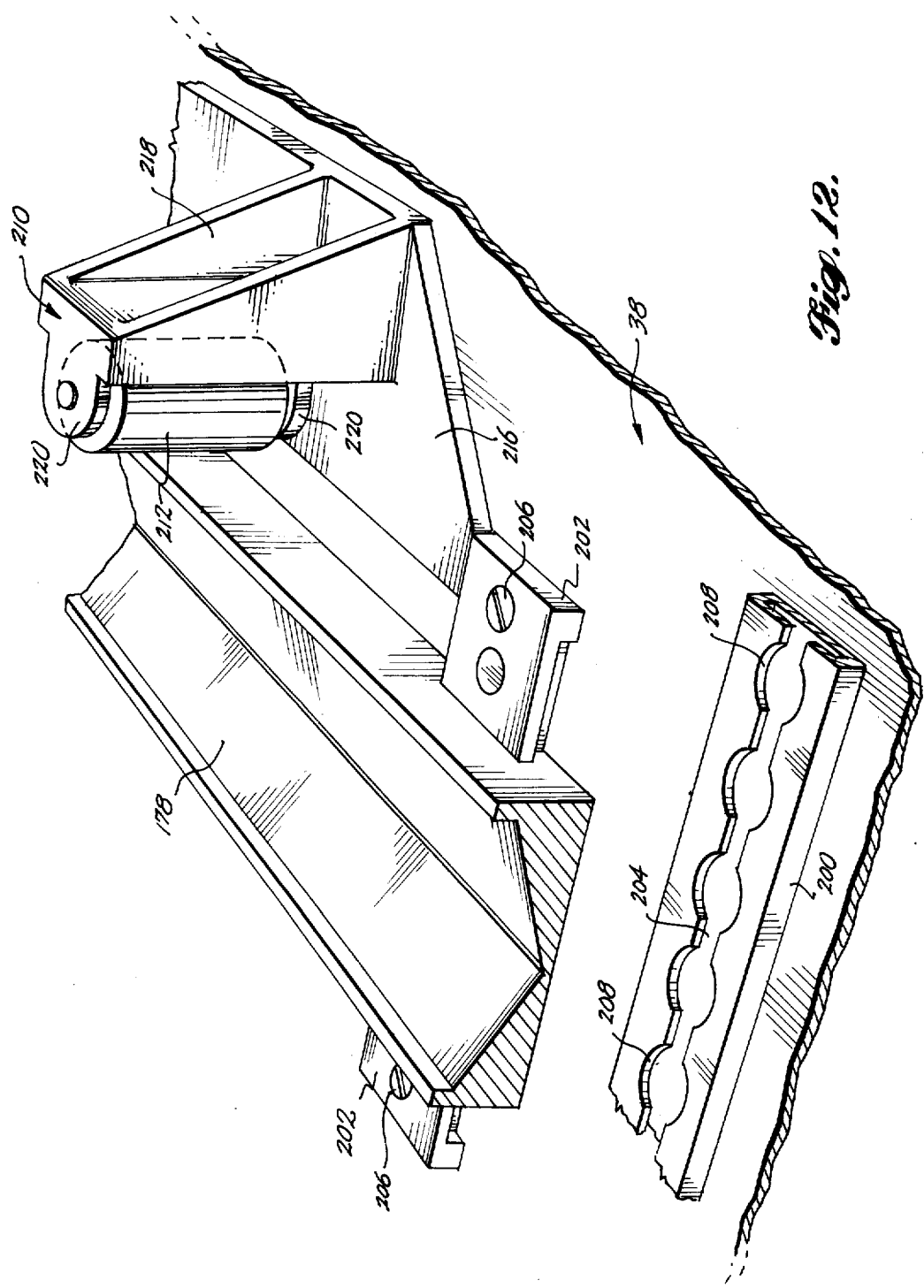

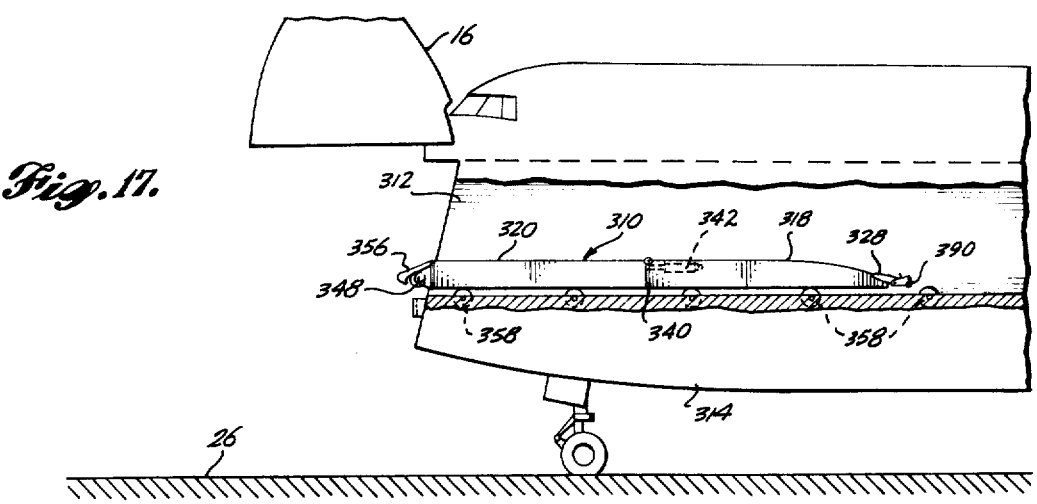
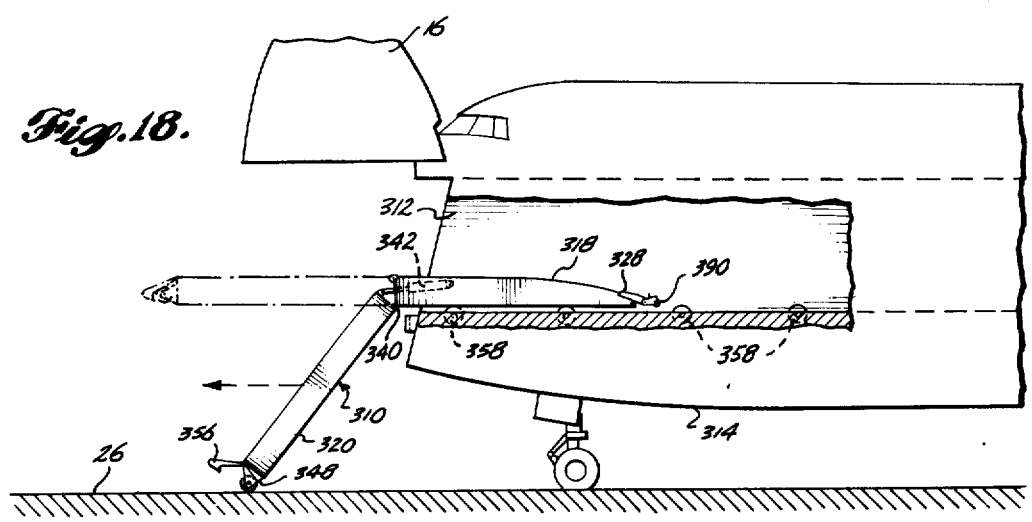
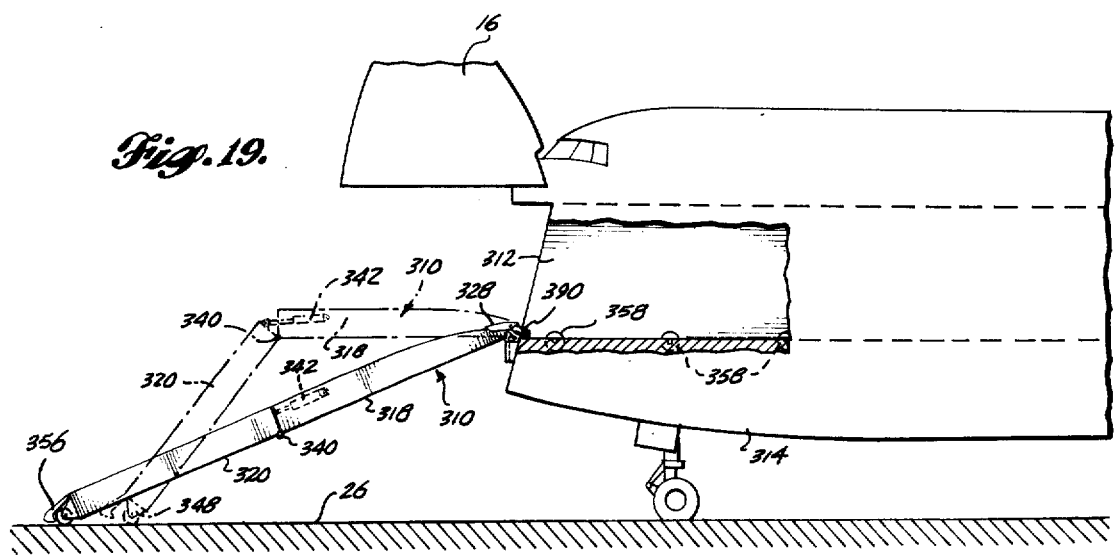

AIRCRAFT CARGO RAMP

BACKGROUND OF THE INVENTION

This invention relates to aircraft cargo handling and more particularly to a cargo ramp configured to be easily carried on board an aircraft and deployable therefrom for the loading of a variety of cargo including relatively large vehicles and cargo of a more general nature, particularly cargo packed on pallets.

The use of aircraft to transport cargo has grown dramatically throughout the past decade or so and a variety of aircraft are now commercially available that are specifically configured for cargo handling. One of the problems with such cargo aircraft has been associated equipment for loading and unloading the cargo. Although satisfactory ground based cargo handling equipment is often available at the larger modern airports, such aircraft are often utilized to carry cargo into airports lacking such equipment. Accordingly, several attempts have been made within the prior art to provide a cargo loading and unloading system that is carried on board the aircraft.

Generally, prior art systems for the loading and unloading of cargo have included ramp structure that is either stowed within the aircraft or ramp structure that forms a portion of the aircraft fuselage during periods of nonuse. The prior art cargo ramps have not proven totally satisfactory, however, since no single prior art cargo ramp has simultaneously provided the many desired features. For example, such a cargo ramp should be of minimum weight and occupy minimum space when stowed within the aircraft so as to maximize the cargo carrying capacity of the aircraft. Secondly, an onboard cargo ramp should be easily and rapidly deployable from the aircraft (and stowable therein) to minimize the time and effort required to load and unload the cargo. In addition, such a cargo ramp should be capable of handling a variety of cargo including relatively large vehicles such as trucks and military armored vehicles, cargo packed in large containers and cargo packed on pallets of various dimensions.

Accordingly, it is an object of this invention to provide a cargo ramp that can be carried on board an aircraft being readily deployable and stowable to facilitate the loading and unloading of a variety of differently configured cargo.

It is an associated object of this invention to provide a light weight cargo ramp that can be stowed in a reasonably small region of the cargo compartment of an aircraft and easily deployed for the loading and unloading of cargo.

It is yet another object of this invention to provide an on board cargo loading ramp that can be rapidly deployed from a cargo aircraft and rapidly and easily adapted to facilitate various types of cargo including self powered vehicles and cargo mounted on various sized cargo pallets.

SUMMARY OF THE INVENTION

These and other objects are achieved in accordance with this invention by a cargo ramp that includes at least two hinged together ramp sections. The cargo ramp is stowed in the cargo compartment during periods of nonuse and is deployable between the sill of the aircraft cargo opening and the ground to facilitate loading and unloading of cargo.

In each embodiment of the invention, the hinged together ramp sections are constructed of light weight frame members and an outer skin or covering material. In the preferred embodiments, the cargo ramp has a generally U-shaped cross-sectional geometry defined by two track regions that are separated by a central recess or well. The width of the track regions and the well that separates the track regions from one another are dimensioned to accommodate the loading of vehicles including automobiles, trucks and military weapon systems such as tanks. Such vehicles can be driven up or down the cargo ramp or, if desired, can be propelled by means of a cable and winch system that is generally a part of aircraft configured for cargo handling. Locking mechanisms, located on the lateral face of adjoining hinged ramp sections, securely latch the ramp sections together during the cargo ramp deployment sequence to thereby form a unitary ramp structure.

A first type of deployment fitting, located along each outside edge of the cargo ramp upper terminus includes rollers that support the weight of the cargo ramp during one portion of the ramp deployment sequence. These rollers are engagable with guide channels mounted on the floor of the aircraft cargo compartment. A second type of deployment fitting, located along the cargo ramp side walls at the cargo ramp upper terminus is configured to securely lock the upper end of the deployed ramp to the sill region of the aircraft cargo opening. In the preferred embodiment of the invention, the second deployment fitting engages with the aircraft sill fittings that are utilized to latch the cargo door in a closed position.

Wheel assemblies, located at the lower terminus of the cargo ramp, are utilized during portions of the cargo ramp deployment sequence so that the lower terminus of the cargo ramp may be easily moved outward from the aircraft cargo opening. In the preferred embodiments, wheel covers, arranged to automatically extend from the cargo ramp lower terminus to the surface of the ground as the cargo ramp is deployed, form extensions of the cargo ramp track regions.

The handling of cargo packed on pallets, or other general cargo having a relatively flat bottom surface, e.g. crates, is facilitated by a series of inboard and outboard roller assemblies that can be deployed at intervals along the length of the cargo ramp. The outboard roller assemblies are deployed to extend inwardly across a portion of the track region from the outboard edges of the cargo ramp and the inboard roller assemblies are deployed to extend outwardly across a portion of the track region from the boundary between the track regions and the well. The handling of such cargo is also facilitated by guide rail assemblies which are deployable to form curb-like upward projections along each outboard edge of the cargo ramp upper surface. The guide rail assemblies are pivotable to extend downwardly along the outside walls of the cargo ramp for storage. In addition, the guide rail assemblies can be deployed in either of two deployment positions to effectively establish two different cargo ramp widths. In the preferred embodiment, the cargo ramp and the guide rails are dimensioned such that the two guide rail deployment positions establish cargo ramp widths corresponding to the dimensions of two standard sized cargo pallets. The outboard roller assemblies are pivotable for stowage within the guide rail assemblies, and the inboard roller assemblies are pivotable to extend downwardly along the walls of the central well for storage.

BRIEF DESCRIPTION OF THE DRAWINGS

FIG. 12 is a partial perspective view depicting guide channels and a roller assembly, mountable within the aircraft employing the cargo ramp embodiment of FIG. 1, for engaging with the deployment means depicted in FIGS. 9-11;

DETAILED DESCRIPTION

Figure 1:
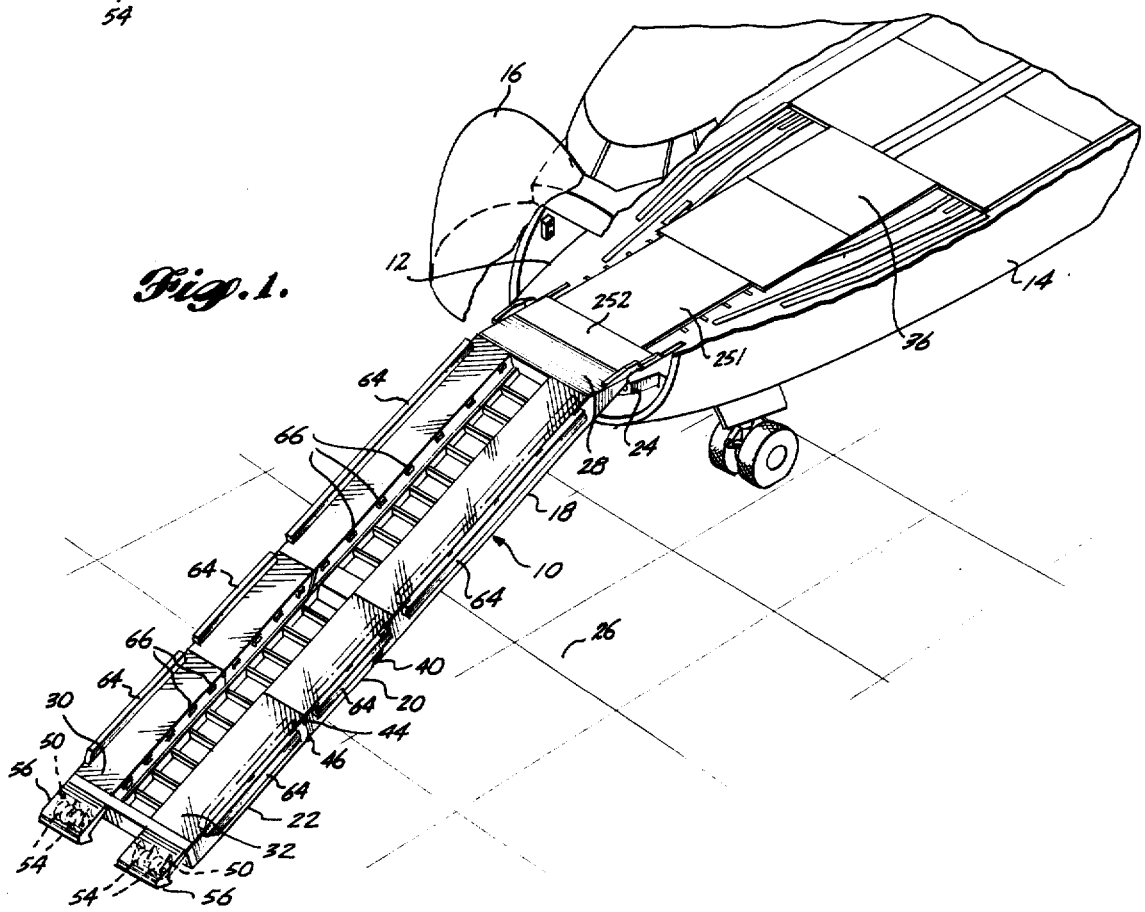
FIG. 1 is a perspective view depicting one embodiment of a cargo ramp deployed between the cargo opening of an aircraft and the surface of the ground.

FIG. 1 depicts one embodiment of a cargo ramp 10 in accordance with this invention deployed from a forward cargo opening 12 formed in the fuselage an aircraft 14 by an upwardly swingable nose section 16. Aircraft configured in such a manner are known in the art and are just one example of cargo aircraft that can advantageously employ this invention.

The cargo ramp 10 includes three ramp sections (18, 20, 22) that are hinged together to form an inclined plane between the sill 24 of the cargo opening 12 and the surface of the ground 26. Each ramp section (18, 20, 22) is generally constructed of structural members and spacers that are interconnected to form a relatively light weight frame. The exterior boundaries defined by this frame are covered with metal panels to form an outer covering or skin. The upper surface of each cargo ramp section is configured to define two track regions 30 and 32 that extend longitudinally along outer portions of the upper surface of the deployed cargo ramp 10.

The tracks 30 and 32 are separated from one another by a recess or well 34 that is longitudinally disposed through the central portion of each cargo ramp section. The tracks 30 and 32 and the well 34 are dimensioned such that the track regions provide a support surface for the loading or unloading of vehicles, with the vehicles being driven under their own power or moved along by a power driven winch and cable system that is generally included on aircraft configured for cargo handling. The well 34, minimizes the overall weight of the cargo ramp 10 and provides a convenient channel for routing the cable of the above mentioned cable and winch system.

The upper ramp section 18 is attached to the sill 24 of the cargo opening 12 by a deployment assembly 28 that securely interconnects the upper end of the cargo ramp 10 with the aircraft when the ramp is deployed (as shown in FIG. 1). As shall be described relative to FIGS. 9-11, the deployment assembly 28 also serves as a portion of the apparatus that facilitates deployment of the ramp 10 from a stowed position within the aircraft cargo compartment 36 to the deployed position of FIG. 1.

The lower end of the upper ramp section 18 is pivotably attached to the adjoining upper end of the second ramp section 20 by hinges 40 transversely mounted along the lower surface of the cargo ramp beneath each of the tracks 30 and 32. An actuator 42 such as a ball screw actuator is located within the interior region of the upper ramp section 18 beneath each track region 30 and 32 each with one end of each actuator pivotably attached to the second ramp section 20 near the upper surface of the cargo ramp. As shall be discussed hereinafter, the actuator 42 supplies a linear translation that causes the upper and second ramp sections 18 and 20 to pivot about the hinges 40 during the deployment sequence and also during the loading and unloading of cargo of an elongate shape that would normally prevent the cargo from passing through the cargo opening 12.

The second ramp section 20 is joined to the lower ramp section 22 by hinges 44 that are located along the upper surface of the track regions 30 and 32. A locking mechanism 46, located along the adjoining edges of the lower surface of the ramp sections 20 and 22 locks the second and lower ramp sections together when the cargo ramp 10 is fully deployed.

The lower end of the lower ramp section 22 is attached to two wheel assemblies 48 that are mounted adjacent to the forward or lower end of each track 30 and 32. Each wheel assembly 48 includes a number of generally triangular support brackets 50 that are mounted to project forwardly from the terminating face of the lower ramp section 22. An axle which passes through the support brackets 50 at a position near the apex of each triangular shaped bracket, supports the wheels 54 such that the wheels contact the surface of ground during portions of the cargo ramp deployment sequence and when the cargo ramp 10 is in the deployed position depicted in FIG. 1.

Two wheel covers 56, pivotably attached to the lower end of the lower cargo ramp section 22, are arranged to cover the wheels 54 when the cargo ramp 10 is deployed. Each wheel cover 56 is generally of a width commensurate with the width of the cargo ramp track regions 30 and 32 and effectively forms an extension of the tracks extending from the upper surface of the lower end of the lower ramp section 22 to the surface of the ground 26. As shall be discussed relative to the deployment sequence. a cable and pulley arrangement (not shown in FIG. 1) passes through the interior region of the cargo ramp between the wheel covers 56 and the lower end of the upper ramp section 18 to pivot the wheel covers 56 upwardly about the lower edge of the lower ramp section. This pivotable motion is automatically effected by the rotation of the upper and second cargo ramp sections (18 and 20, respectively) about the hinges 40 and ensures that the forward edge of the wheel covers 56 will not contact the ground before the surface of the wheels 54 when the cargo ramp 10 is deployed from the aircraft 14.

Figure 2:
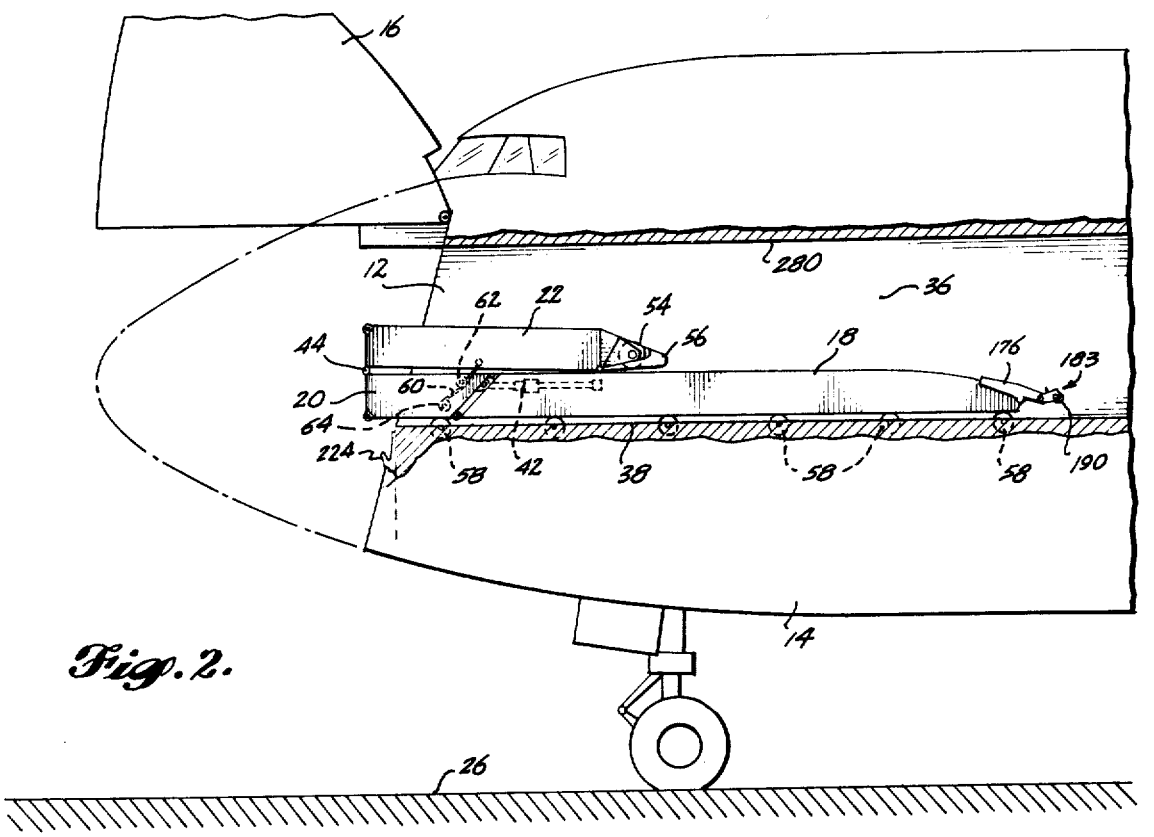
FIG. 2 is an elevation view of the cargo ramp embodiment of FIG. 1 stowed within the cargo compartment of an aircraft.

Referring to FIG. 2, it can be seen that the cargo ramp 10 is stowable within the aircraft cargo compartment 36 with the upper ramp section 18 and the second ramp section 20 resting on rollers 58 that are mounted in the floor 38 of the cargo compartment 36. The rollers 58 are generally included in aircraft configured for cargo handling, with a portion of the rollers often being driven by a power unit (not shown in FIG. 2) to aid in the movement of cargo within the aircraft 14. In the stowed position of cargo ramp 10, the lower cargo ramp section 22 is folded about hinges 44 such that the lower ramp section rests on and extends along the second and upper ramp sections (20 and 18), projecting toward the rear of the aircraft 14. As shall be described in detail hereinafter, the lower ramp section 22 is swung into the stowage position during the ramp stowage sequence by a cable 60. One end of the cable 60 is connected to a point intermediate the two ends of the lower ramp section 22, with cable 60 passing through an idler pulley 62 mounted near the upper surface of the second cargo ramp section 20. The second end of the cable 60 is connected to a drive pulley 63 that is generally driven by an actuator such as a reversible electric motor (not shown in FIG. 2).

In addition to the track regions 30 and 32 for handling cargo vehicles, the embodiment of this invention depicted in FIGS. 1 and 2 includes deployable guide rail assemblies and roller assemblies to facilitate the loading and unloading of cargo containers or cargo mounted on pallets. Referring to FIG. 1, elongate guide rail assemblies 64 of a generally rectangular cross section are hinged along the outer boundaries of each cargo ramp section (18, 20 and 22). The guide rail assemblies 64 are located along the outer edges of each cargo ramp section 18, 20 and 22 and are pivotably deployable to form a curb-like upward projection along the outer edges of the cargo ramp 10, e.g. the guide rail 64 shown in FIG. 1 along the edge of track 30, and are pivotably deployable to a stowage position such that the guide rails 64 extend downwardly along the exterior wall of the cargo ramp 10, e.g. the guide rail assemblies 64 shown in FIG. 1 along the edge of track 32. Further, as shall be described in detail hereinafter, each guide rail assembly 64 is formed of component parts that are hinged along the inside edge of the guide rail assembly such that the guide rails can be pivoted from the deployed position illustrated by the guide rails 64 of FIG. 1 in which the inside surface of the guide rail extends upward from and essentially coincident with the outer wall of the cargo ramp 10 to a second deployed position in which the guide rails are pivoted inwardly toward the well 34 such that the uppermost guide rail surface of the first deployment position forms the inwardly-facing surface of the guide rail in the second deployment position. This arrangement is especially advantageous in the handling of cargo loaded on pallets, since the guide rail assemblies 64 can be dimensioned to define two different predetermined distances between opposite laterally disposed guide rails. For example, since two standard dimensioned cargo pallets are presently in use by the U.S. military, (with commercial air cargo carriers commonly using substantially identically dimensioned pallets), the guide rail arrangement of this invention can be dimensioned such that the first standard size pallet extends substantially across the cargo ramp lateral dimension defined by the first guide rail deployment position and the second standard size pallet extends substantially across the cargo ramp lateral dimension defined by the second guide rail deployment position.

Inboard roller assemblies 66, mounted along the inboard edges of tracks 30 and 32, are pivotably attached to the walls of the well 34 such that the rollers can be pivoted to extend downwardly along the well walls when not in use or pivoted to extend laterally across a portion of the surface of the track 30 and 32. Each roller assembly 66 is configured such that the upper surface of a roller contacts the lower surface of cargo that is moved between the ground 26 and the aircraft cargo opening 12.

Figure 3:
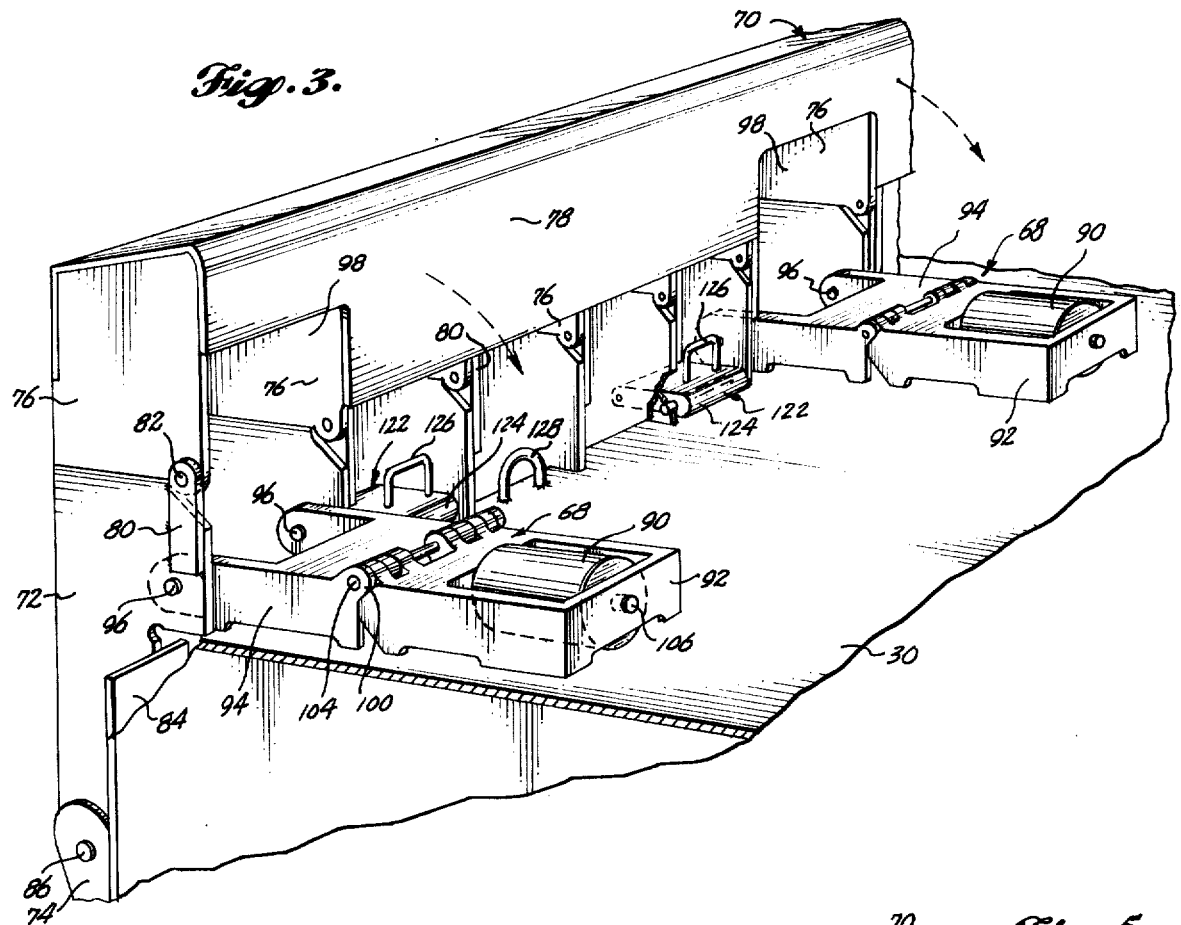
FIG. 3 is a partial perspective view depicting the guide rail assemblies and the outboard roller assemblies of the embodiment of this invention depicted in FIG. 1.

As shown in FIG. 3, a number of outboard roller assemblies 68 are spaced along the length of each guide rail assembly 64 and are arranged such that the roller assemblies 68 can be pivoted into the interior region of the guide rail assembly for stowage, or can be pivoted to extend laterally from the inside surface of the guide rail toward the boundary of the well 34 when required for handling cargo. Each outboard roller assembly 68 includes a frame-like bracket mounted so that the axis of rotation of the deployed roller is substantially perpendicular to the outer wall 84 of the cargo ramp 10, with the upper surface of a roller 90 contacting the bottom surface of cargo that is moved up or down the cargo ramp 10.

Each guide rail assembly 64 includes a guide rail 70, a number of upper hinge brackets 72 and a like number of lower hinge brackets 74. The guide rail 70 is an elongated member of trapezoidal cross section formed by a series of spacer plates 76 and a metal channel 78 of generally U-shaped cross section. The guide rail spacer plates 76 are mounted at intervals across the interior open area of the channel 78 such that the exterior surface of the channel forms the outside walls of the guide rail 70 and the spacer plates 76 form the guide rail end walls and lateral partitions along the length of the guide rail 70. The lower inboard corner of each spacer plate 76 (in the orientation depicted in FIG. 3) defines a radiused tabular projection for hinging the guide rail 70 to the upper hinge brackets 72.

Each upper hinge bracket 72 is a relatively flat metal plate that is mounted on edge to extend upwardly along the outer surfaces of the cargo ramp 10 between the guide rail 70 and the lower hinge brackets 74. A small tubular hinge plate 80 is connected to each upper hinge bracket 72 so as to extend upwardly along the inboard edge of the upper hinge bracket with the hinge plate 80 projecting beyond the upper hinge bracket edge. A hinge pin 82, extending through the projecting portion of each hinge plate 80 and the tabular extension of an adjoining spacer plate 76, pivotably attaches the guide rail 70 to the upper hinge brackets 72.

The lower hinge brackets 74 are mounted on the exterior wall 84 of the cargo ramp 10 to pivotably attach each upper hinge bracket 72 to the cargo ramp 10. Each lower hinge bracket 74 is a generally orthogonal extrusion or formed metal part with one leg of the extrusion connected to the exterior wall 84 of the cargo ramp 10 such that the second leg of the extrusion projects outwardly from the wall 84 and is generally perpendicular therewith. The upper portion of the upwardly projecting lower hinge bracket is radiused and extends beyond the terminating edge of the other leg. A hinge pin 86 pivotably attaches each lower hinge bracket 74 to an adjoining upper hinge bracket 72 with the portion of the upper hinge bracket that overlaps the lower hinge bracket radiused to permit the upper hinge bracket 72 to rotate about the hinged connection.

FIG. 3 depicts the guide rail assembly 64 deployed in a first position to define a first predetermined distance between the inboard guide rail surfaces of the guide rails mounted along cargo track regions 30 and 32. In this first deployment position, the lower edges of each spacer plate 76 abut the upper edge of an adjoining upper hinge bracket 72 such that the inboard surface of the guide rail 70 projects directly upward from and substantially perpendicular to the outboard edge of the cargo ramp track 30. In this first deployment position, the distance between the inboard surfaces of the guide rails 70 that are mounted along track regions 30 and 32 is generally established to correspond to the larger of two standard size cargo pallets.

Figure 4:
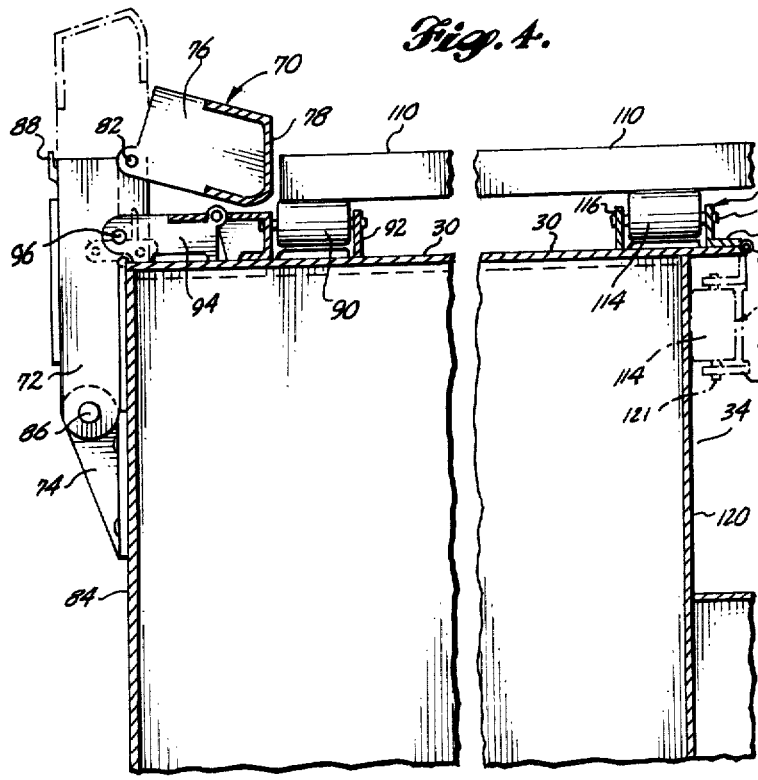
FIGS. 4 and 5 are cross-sectional views depicting the inboard roller assemblies of the cargo ramp embodiment depicted in FIG. 1, deployment and stowage of the guide rail assemblies of FIG. 3, and the deployment and stowage of the inboard roller assemblies and the outboard roller assemblies.

In FIG. 4, the guide rail 70 is shown rotated inwardly toward track 30 to effectively decrease the width of cargo ramp 10 such that the distance between the guide rails 70 mounted along each track 30 and 32 corresponds to a second standard size cargo pallet. In this second deployment position, guide rail 70 is angularly disposed with respect to the upper hinge bracket 72 and the cargo ramp exterior wall 84 with the surface that defines the upper surface of the guide rail 70 in the first deployment position defining the inboard guide rail surface. As can be seen in FIG. 4, a retaining clip 88 is mounted along the upper outside edge of the upper hinge brackets 72 to retain the guide rail 70 in the upright position of the first deployment condition until the guide rail is forcibly rotated into the second deployment condition. The retaining clip 88 is generally a metal extrusion proportioned to form a lip-like protrusion extending upwardly from the upper hinge bracket 72 with retaining clip 88 in frictional contact with the spacer plate 76 of the guide rail 70 when the guide rail is in the first deployment position.

Figure 5:
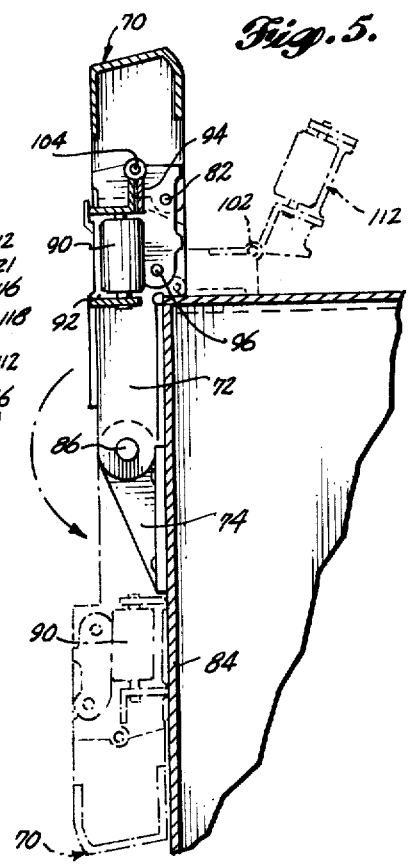

Referring to FIG. 5, it can be seen that when the guide rail assemblies are not utilized, e.g. the cargo ramp 10 is in use for loading or unloading cargo vehicles, the guide rail 70 and the upper hinge brackets 72 can be rotated downwardly about hinge 86 of the lower hinge bracket 74 so that the upper hinge bracket 72 and the guide rail 70 are adjacent to the cargo ramp exterior wall 84. When stowed in such position, the guide rail assembly does not interfere with the movement of vehicular cargo and the guide rail assembly is protected from damage that could be incurred by large, heavy vehicles.

As previously mentioned, the outboard roller assemblies 68 depicted in FIGS. 3, 4, and 5 facilitate the handling of cargo loaded on pallets or other cargo having a generally flat bottom surface, e.g. large crates or containers. Each outboard roller assembly 68 includes a roller 90, a roller mounting plate 92 and a roller hinge bracket 94 arranged such that the roller assembly 68 can be deployed to extend inwardly and substantially perpendicular to the guide rail 70 or can be folded into the interior region of the guide rail 70 for stowage with the guide rail assembly when not in use.

The roller hinge brackets 94 are generally U-shaped brackets with the distance between the outer surfaces of the parallel legs dimensioned to fit between adjacent upper hinge brackets 72. Each roller hinge bracket 94 is pivotably attached to the two adjacent guide rail upper hinge brackets 72 by hinge pins 96 such that the roller assembly 68 can be rotated upwardly into the guide rail 70 through generally rectangular openings 98 in the inboard wall of the guide rail 70, or can be rotated downwardly to extend laterally and partially across the track 30. The inboard ends of the roller hinge bracket parallel legs (relative to the deployed orientation depicted of FIG. 3) include tabular projections 100 that extend angularly upward to form one portion of a hinge 102. The second portion of the hinge 102 is formed by the outboard portion of the roller mounting plate 92 with hinge pin 104 interconnecting the roller mounting plate 92 with the roller hinge bracket 94.

Each roller mounting plate 92 is a generally rectangular frame having a central rectangular opening for mounting a roller 90. Each roller 90 is retained within the roller mounting plate 92 by an axle or pin 106 passing along the axial center line of the roller 90 and through the inboard and outward end walls of the roller mounting plate 92. The roller 90 is arranged within the mounting plate 92 such that when the outboard roller assembly is deployed (FIGS. 3 and 4) the lower surface of the roller does not contact the surface of the track 30 and the upper surface of the roller 90 extends above the upper surface of the roller mounting plate 92 so as to be in contact with a cargo pallet (110 of FIG. 4) or other cargo being moved up or down the cargo ramp 10. Further, the roller hinge bracket 94 and the roller mounting plate 92 are dimensioned such that the roller is located inboard of the guide rail 70 regardless of whether the guide rail is placed in the previously discussed first or second deployment position.

As shown by the phantom lines of FIG. 5, the roller assembly is stowed within the guide rail 70 by first rotating the roller 90 and the roller mounting plate 92 upwardly about hinge 102 so that the roller mounting plate 92 swings through the opening 98 in the inboard surface of the guide rail 70. With the mounting plate 92 essentially folded on the top of the roller hinge bracket 94, the complete roller assembly 68 is rotated upwardly about hinge pin 96 such that the outboard roller assembly 68 is completely contained within the guide rail 70 (shown by the solid lines in FIG. 5).

The inboard roller assemblies 112 depicted in FIG. 4 include a roller 114 and a roller mounting plate 116 pivotably mounted to the inboard edge of cargo ramp track 30 by a hinge 118 such that the inboard roller assemblies can be deployed over the track (e.g track 30 of FIG. 4), or stowed along the wall surface 120 of the well 34. Generally the inboard roller assemblies 112 and the outboard roller assemblies 68 are spaced along the length of cargo ramp 10 at laterally opposed positions along the inboard and outboard edges of the cargo ramp.

The inboard roller mounting plate 116 is a generally rectangular frame having a central rectangular opening for mounting inboard roller 114. Like the rollers 90 of the outboard roller assemblies 68, the rollers 114 of the inboard roller assemblies 112 are mounted by a pin 121 passing along the axial center line of the roller 114 and through the inboard and outboard walls of the mounting plate 116 (relative to the deployed orientation shown by the solid lines in FIG. 4). The inboard portion of the mounting plate 116 includes an orthogonally projecting leg that is attached to the inboard edge of the cargo ramp 30 by the hinge 118. The inboard surface of the track 30 generally projects inwardly over the wall surface 120 of well 34 such that the inboard roller assembly can be swung about hinge 118 for storage along the surface of the well wall 120 (shown by phantom lines in FIG. 4). As in the outboard roller assembly arrangement, the inboard rollers 114 are mounted within the mounting plates 116 such that when the rollers are deployed (shown by the solid lines in FIG. 4) the lower surface of the roller 114 does not contact the surface of cargo ramp 10 and the upper surface of the roller extends above the mounting plate 116 for contacting the lower surface of a cargo pallet 110, or the lower surface of other cargo having a generally flat bottom.

Referring again to FIG. 3, the guide rail 70 and the outboard roller assembly 68 are locked in the deployed position by guide rail locks 122. Each guide rail lock 122 includes a generally rectangular plate 124 rigidly secured between two adjoining guide rail upper hinge brackets 72. The rectangular plate 124 is positioned such that a portion of the lower surface of the rectangular plate rests on the surface of the cargo ramp track 30 when the guide rail assembly is deployed. A U-shaped locking pin 126 is mounted to that portion of the rectangular plate 124 that overlaps the track 30 such that the locking pin is substantially perpendicular to the rectangular plate 124 with the legs of the locking pin extending through the rectangular plate. Each locking pin 126 is spring loaded to the rectangular plate 124 such that the legs of the locking pin project outwardly from the lower surface of the rectangular plate. Holes, located in the surface of the cargo ramp 30, are arranged to mate with the extending locking pins so that when the guide rail 70 is deployed upwardly from the stowed position, the locking pins engage with the holes to secure the guide rail assembly to the cargo ramp track region.

As further illustrated in FIG. 3, generally U-shaped tie down fittings 128 are mounted along the outboard edges of the cargo ramp track 30 so as to form upwardly projecting loops that can be employed for the connection of tie down straps or cables to secure the cargo ramp 10 within the aircraft as shown in FIG. 2. The tie down fittings 128 are positioned such that each tie down fitting is between adjacent upper support brackets 72 not containing an outboard roller assembly 68 or a guide rail lock 122.

Figure 7:
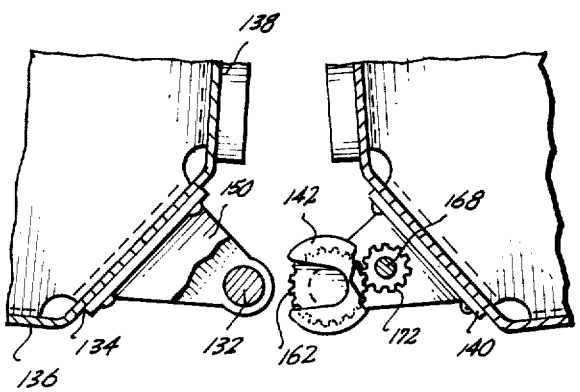
FIGS. 7 and 8 are partial elevation views of the cargo ramp embodiment of FIG. 1, depicting the operation of the locking mechanism of FIG. 6.
Figure 8:
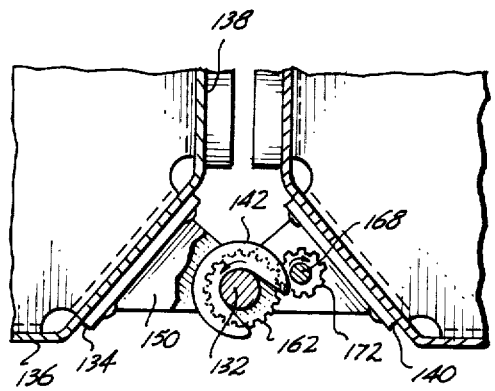
Figure 6:
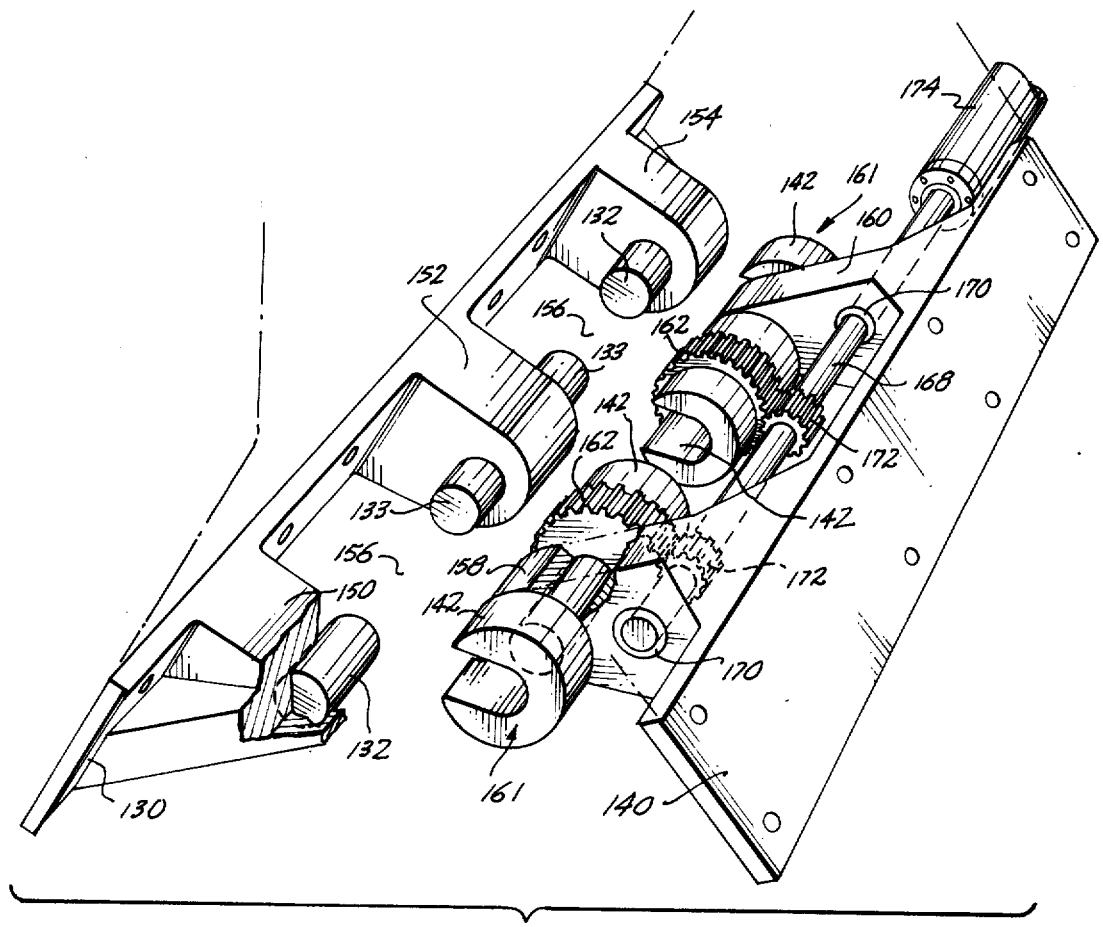
FIG. 6 is a perspective view of a locking mechanism for latching the cargo ramp sections of the embodiment depicted in FIG. 1 when the cargo ramp is deployed.

FIGS. 6, 7 and 8 depict a preferred embodiment of the locking mechanism 46 of FIGS. 1 and 2 that is used to secure the lower cargo ramp section 22 to the second cargo ramp section 20. As previously noted, and as is depicted in FIGS. 6-8, mating portions of the locking mechanism 46 are located near the lower surfaces of the lower ramp section 22 and the second ramp section 20. More specifically, a mounting plate 130 including two outboard locking lugs 132 and two inboard locking lugs 133 is mounted on a surface 134 of the lower cargo ramp section 22 that is angularly disposed between the bottom surface 136 and the upper end surface 138 of the lower cargo ramp section 22. In a similar manner a mounting plate 140 including four gear driven C-shaped keepers 142 that mate with the locking lugs 132 and 133 is transversely mounted on a surface 144 of the second ramp section that is angularly disposed between the bottom surface 146 and the lower end surface 148 of the second cargo ramp section 20. Each mounting plate 130 and 140 is of a length generally commensurate with the width of the track regions 30 and 32. The angularly disposed surfaces 134 and 144 and the mounting plates 130 and 140 are arranged such that the locking lugs 132 and 133 engage with the C-shaped keepers 142 as the end surfaces of the lower end second ramp sections are swung about hinges 44 (FIG. 1) and come into alignment with one another during the cargo ramp deployment sequence.

The lower ramp section mounting plate 130 is a generally elongate metal bracket having three orthogonally projecting support arms 150, 152 and 154 with support arms 150 and 154 respectively located near the outboard and inboard ends of the mounting plate and support arm 152 centrally located between the support arms 150 and 154. An outboard locking lug 132 projects inwardly from each support arm 150 and 154, with the outboard locking lugs 132 being spaced apart from and essentially parallel to the surface of the mounting plate 130. The inboard locking lugs 133 each project outwardly from the center support arm 152 and are spaced apart from and essentially parallel to the surface of the mounting plate 130. Each locking lug 132 and 133 is a circular metal rod with the length of the locking lugs established such that a space or gap 156 dimensiioned to permit engagement by the latching mechanism of the second cargo ramp section 20 is formed between oppositely mounted inboard and outboard locking lugs.

The mounting plate 140 of the second cargo ramp section 20 includes two orthogonally projecting support arms 158 and 160 that are positioned so as to be in alignment with the gaps 156 between the locking lugs of the mounting plate 130. A rotatable latching assembly 161 including two C-shaped keepers 142 and a drive gear 162 is mounted on a shaft 164 that passes through a bearing 166 in the outer portion of each support arm 158 and 160. With reference to each latching assembly 161, one keeper 142 is mounted on the outboard side of the support arm (158 or 160) and a second keeper 142 is mounted on the inboard side of the support arm. Each drive gear 162 coaxially surrounds a portion of the inboard keepers. The shaft 164, the keepers 142, and the drive gears 162 are arranged such that the axis of rotation is essentially parallel to the surface of the mounting plate 140. Further the shaft, keepers, and drive gears are dimensioned to mate with the locking lugs 132 and 133 of the lower ramp section latching mechanism.

A second shaft 168, passing through bearings 170 that are mounted through the support arms 158 and 160 at a location between the surface of the mounting plate 140 and the latch assembly 161, includes two pinion drive gears 172 that are positioned to engage locking gears 162. The inboard end of the shaft 168 is connected to a torque tube 174 that extends laterally to the cargo ramp well 34. The torque tube 174 is generally driven by a reversible electric motor located within the well 34 (not shown in FIGS. 6 through 8). The locking mechanisms associated with each track region 30 and 32 of the cargo ramp 10 can be driven by a separate electric motor or a single electric motor can be utilized. In any case, the electrical wiring for controlling the motor and hence the locking mechanism generally passes through the interior of the cargo ramp to the upper end thereof such that the locking mechanism can be controlled from within the aircraft 14.

As shown in FIGS. 7 and 8, as the lower ramp section 22 and the second ramp section 20 are brought together during the ramp deployment sequence, the C-shaped keepers 142 are positioned so as to engage locking lugs 132 and 133. As shown in FIG. 8, when the keepers 142 engage the locking lugs, the electric motor is activated to drive the shaft 168 and the pinion drive gears 172. The rotation of the pinion gears turns the locking gears 162 and the associated keepers 142 so that the closed surface of the C-shaped keepers prevents downward or outward forces on the lower ramp section 22 from disengaging the lower ramp section 22 from the second ramp section 20.

Figure 9:
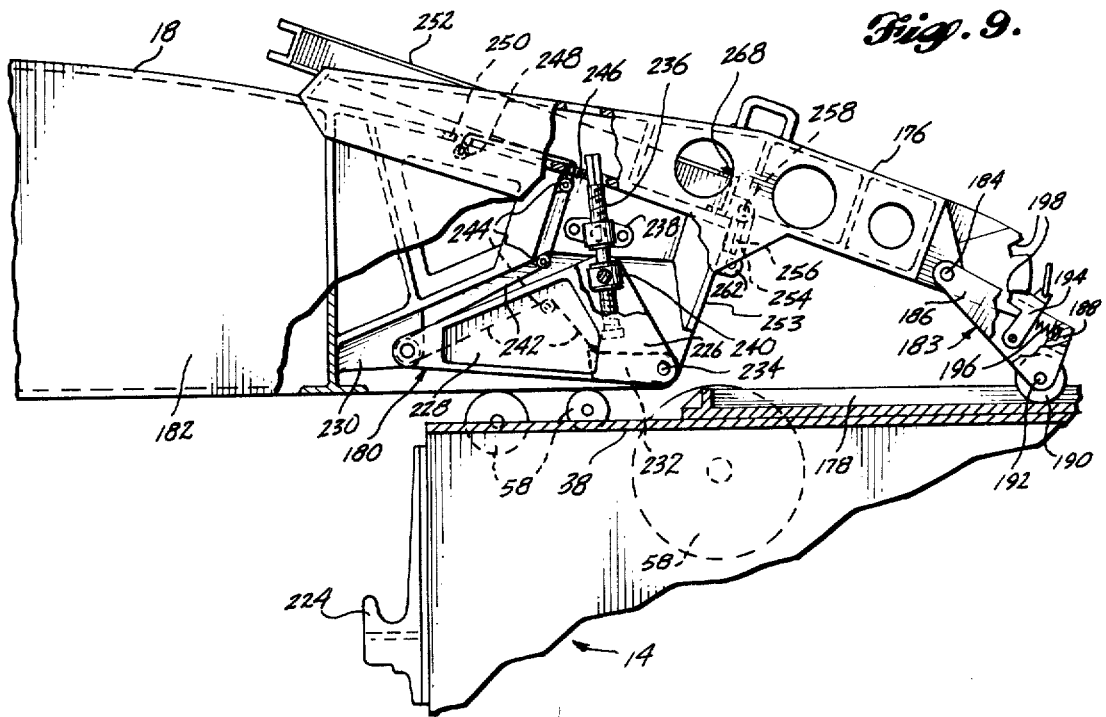
FIGS. 9 and 10 are partial elevation views of the cargo ramp embodiment of FIG. 1 illustrating the cargo ramp deployment means and means for attaching the upper terminus of the cargo ramp to the aircraft when the cargo ramp is deployed.
Figure 10:
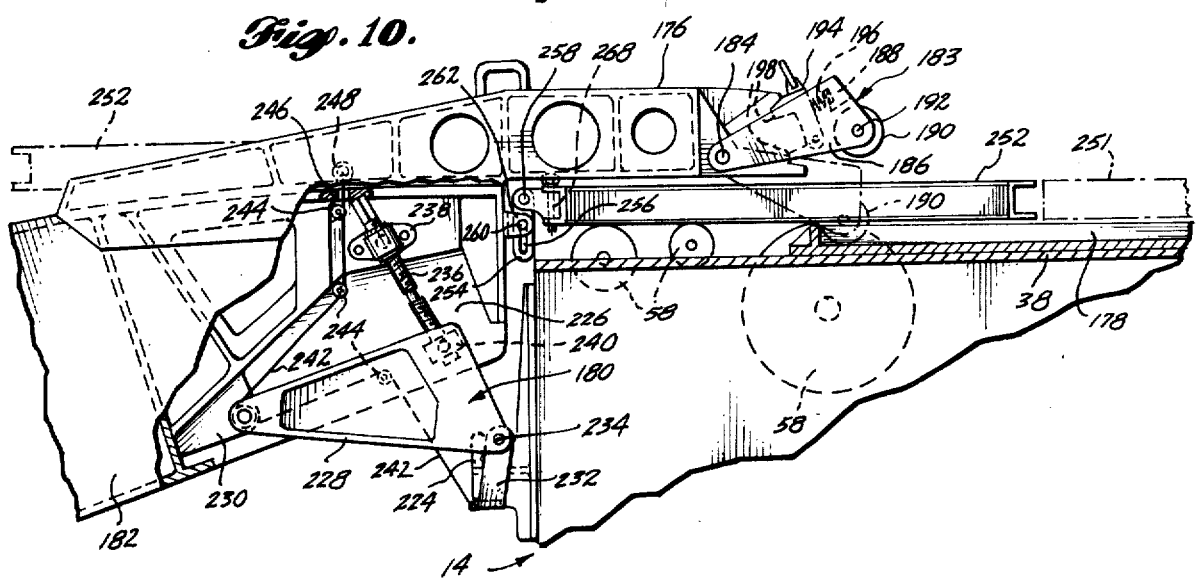
Figure 11:
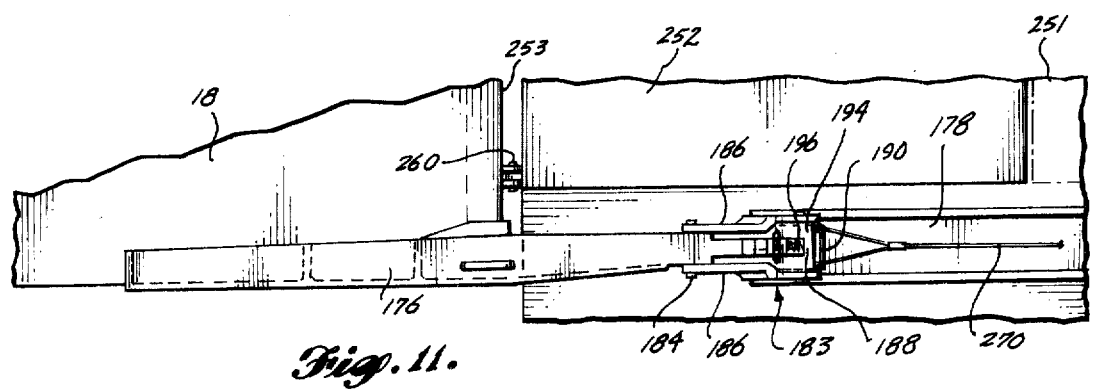
FIG. 11 is a partial plan view of the cargo ramp embodiment of FIG. 1 further illustrating the deployment means of FIGS. 9 and 10.

FIGS. 9, 10, and 11 depict the deployment and latching mechanism 28, which as previously noted, interconnects the cargo ramp 10 to the sill region of the aircraft cargo opening 12 and also facilitates the deployment of the cargo ramp 10 from a stowed position within the aircraft 14 (FIG. 2) to the deployed position depicted in FIG. 1. Basically, the depicted deployment and latching mechanism includes deployment struts 176, guide channels 178 and still deployment fittings 180.

Each deployment strut 176 is an elongated structural member that is mounted longitudinally along the outside edges of track regions 30 and 32 of the upper ramp section 18. A portion of each deployment strut 176 projects beyond the terminus of the upper ramp section 18 with the projecting portions of the deployment struts 176 essentially parallel to one another and parallel to the outside edges of the cargo ramp 10. The portion of the deployment struts 176 that is located over the upper end of the upper cargo ramp section 18 is generally formed to include a flange that extends downwardly along the outer side surface 182 of the cargo ramp 10 such that the deployment struts can be connected to both the surface of the track regions 30 and 32 and also to the cargo ramp outer side surface 182.

The outermost end of the projecting portion of each deployment strut 176 is pivotably connected to a deployment fitting 183 by hinge pin 184 that passes laterally through the lower portion of the deployment strut 176. Each deployment fitting 183 includes two triangular shaped side plates 186 interconnected and spaced apart from one another by a generally rectangular end plate 188. The end plate 188 is located adjacent to two sides of the triangular side plates 186. The apex of the triangular side plates 186 that is opposite the end plate 18 is connected to the deployment strut 176 by the hinge pin 184 such that the deployment fitting 183 can be pivoted upwardly about the outermost end of the deployment strut 176.

A wheel 190, which extends downwardly from the deployment fitting 183, is mounted between the triangular side plates 186 by a pin 192 that passes through the lower apex of the deployment fitting side plates 186. A retaining latch 194, of a generally L-shaped cross section, is pivotably mounted between the two side plates 188 at a position between the location of the wheel 190 and the hinged attachment to the deployment strut 184. The retaining latch 194 is oriented such that one leg of the retaining latch projects toward the outermost end of the deployment strut 176. A compression spring 196, mounted between the latch 194 and the deployment fitting end plate 188 forces the latch toward the end of the deployment strut. Two notches 198 are located laterally across the outermost end of the deployment strut 176 for engagement by the retaining latch 194. The first or uppermost of the notches 198 is positioned such that the lower surface of the deployment wheel 190 can be retained above the lower surface of the deployment strut 176. The second or lowermost of the notches 198 is positioned such that the lower surface of the wheel 190 can be maintained below the lower surface of the deployment strut 196 for engagement with a guide channel 178. As shall be discussed relative to the ramp deployment sequence, the deployment fitting 183 is latched in the downwardly extending position during a specific portion of the deployment sequence and is latched in the upward position when the ramp is stowed in the aircraft and during the remaining portion of the deployment sequence.

As shown in FIGS. 9 through 11, and as is more clearly shown in FIG. 12, each guide channel 178 is an elongate metal channel having a generally V-shaped groove substantially the full length thereof. Each guide channel 178 is mountable to extend longitudinally along the floor 38 of the cargo area of the aircraft 14 to engage with the wheels 190 of the deployment fittings 183. Essentially the guide channels 176 form a track for the cargo ramp 10 during a portion of the deployment sequence, with the V-shaped grooves of the guide channel tending to maintain the cargo ramp 10 in a centered position as the cargo ramp is moved outwardly from the aircraft 14. Generally, guide channels 178 are arranged to be easily removable from the floor 38 of the aircraft cargo region.

One convenient method of detachably mounting the guide rails 178 to the cargo floor 38 with connecting brackets such as those utilized to fasten the seats in position within a passenger aircraft is depicted in FIG. 12. In this arrangement, generally rectangular brackets 200 having a slot 204 extending centrally along the bracket length are mounted on the aircraft floor 38 so as to extend perpendicular to and across the width of the installed guide rail 178. Generally rectangular locking blocks 202 engage with a groove or a lip along the lower surface of the guide channel 178. The bottom surface of each locking block 202 is configured to engage with the mounting bracket slot 204 when the guide channel 178 and the locking blocks 202 are placed on top of the mounting bracket 200 and slid inwardly toward the center of the aircraft 14. When the guide rails 178 are in position, retaining screws 206 are placed through holes in the locking blocks 202 that are arranged to mate with holes 208 in the mounting plate 200 to securely fasten the guide channel 178 to the cargo region floor 38.

As further illustrated in FIG. 12, it is advantageous to include a vertical guide roller assembly 210 mounted along the outside edge of each guide channel 178. The guide rollers assemblies 210 are positioned such that the surface of a roller 212 contacts the side surfaces of the cargo ramp 10 during the deployment sequence if the cargo ramp should move other than directly outwardly from the aircraft cargo opening, i.e. should the cargo ramp 10 tend to move laterally toward either side of the aircraft.

Each roller 212 is mounted in a roller support bracket 214 that is mounted between two adjacent locking blocks 202 of the previously described guide channel attachment arrangement. The roller support bracket 214 includes a generally flat base plate 216 that is mounted between the two adjacent locking blocks 202. Alternatively, the adjacent locking blocks 202 can be an integral part of the base plate 216. An orthogonal bracket 218, mounted to project upwardly from the base plate 216, includes two horizontal spaced apart roller mounting surfaces 220 that project inwardly toward the mounted guide channel 178. A pin 222, passing between the roller mounting surfaces 220, passes along the axial center line of the roller 212 such that the inboard surface of the roller is free to contact the side surfaces of cargo ramp 10 if the ramp does not travel directly forward during the hereinafter deployment sequence.

Referring again to FIGS. 9 and 10, each sill deployment fitting 180 that is utilized to lock the cargo ramp 10 to the aircraft sill fittings 224 is located in a recess 226 in the side wall 182 of the upper cargo ramp section 18. In the depicted embodiment, aircraft sill fittings 224 are the fittings engaged by the swingable nose section 16 to close the cargo opening 12 (FIG. 1).

Each sill deployment fitting 180 includes a triangular shaped frame 228 generally constructed of two triangular metal plates separated by spacer blocks. One apex of the triangular shaped frame 228 is pivotably connected to a mounting flange 230 that extends from the upper rear wall of the recess 224. A generally U-shaped safety stirrup 232, dimensioned for engagement with the aircraft sill fittings 224 is pivotably mounted to a second apex of the triangular frame 228 by a hinge pin 234 which passes through the outermost portion of the two legs of the safety stirrup 234 and the apex of the frame 228.

A turn buckle 236 is threadably engaged with a bracket 238 that is mounted on the side wall 182 of the upper cargo ramp section 18 and is threadably engaged with a gimbled threaded spacer 240 mounted between the triangular metal plates of the sill deployment fitting frame 228. The uppermost end of the turn buckle 236 is generally machined to accommodate a conventional hand tool such as a torque wrench so that the turn buckle may be used to raise and lower the deployment sill fitting 180 by pivoting the sill fitting about the apex of the frame 228.

As is illustrated in FIGS. 9 and 10, and shall be discussed in more detail hereinafter, prior to the full deployment of the cargo ramp 10 and the engagement of the sill deployment fitting 180 with the aircraft sill fittings 224, the safety stirrup 232 is pivoted against the lower edge of the frame 228 and the turn buckle 236 maintains the frame 228 in its uppermost position (FIG. 9). Preferably the safety stirrup 232 is spring loaded by a torsion spring (not shown in FIGS. 9 and 10) that is included with the hinge pin 234 such that the spring force tends to maintain the safety stirrup 232 in its uppermost pivoted position. In such an embodiment, a cable 242 connected to the lower portion of the outermost end of the safety stirrup 232 retains the safety stirrup in the stowed position of FIG. 9 when the sill deployment fitting 180 is not engaged with the aircraft sill fittings 224 and releases the safety stirrup 232 for engagement with the sill fittings 224 when the cargo ramp 10 is fully deployed. Cable 242 passes over idler pulleys 244 that are mounted along the wall of the recess 266 and also passes over the hinge connection between the sill deployment fitting frame 228 and the mounting flange 230 such that the cable extends through a hole 246 in the upper surface or track region of the cargo ramp upper section 18. A retainer 248, such as a small metal ring, is connected to the free end of the cable 242 to prevent the free end of the cable from passing through the hole 246 and to permit retention of the safety stirrup in the pivoted position of FIG. 9 by engagement of the retainer 248 with a retaining slot 250 in the upper surface of the upper cargo ramp section 18 (FIG. 9).

As further depicted in FIGS. 9 through 11, a sill bridge 252 is pivotably attached to the edge of the upper cargo ramp section 18 for deployment between the end of the cargo ramp 10 and the first pallet 251 on the cargo compartment floor 38 (FIG. 10). The sill bridge 252 is a substantially flat rectangular panel having a width commensurate with the width of the cargo ramp 10 and a length which spans the gap between the cargo ramp terminus 253 and the edge of the first cargo pallet 251. The sill bridge 252 is hinged to the cargo ramp terminating edge 253 by a slotted hinge plate 254 located along the outboard edge of the sill bridge 252. Each slotted hinge plate 254 is a generally rectangular, flat metal member having a slot 256 along the length thereof. A bracket 262 extending substantially perpendicular to the upper ramp section terminating surface 253 is interconnected with the slotted hinge plate 254 by hinge pin 258. The hinge plate 254 is interconnected with orthogonally extending flanges of sill bridge 252 by a second hinge pin 260. With this arrangement, the sill bridge 252 can be swung upwardly to rest against the upper surface of the cargo ramp upper section 18 when the cargo ramp 10 is not fully deployed (FIG. 9), and can be swung downwardly against the aircraft floor 38 to effectively form an extension of the cargo ramp upper surface when the cargo ramp 10 is fully deployed (FIGS. 10 and 11).

Preferably the sill bridge 252 is detachable from the upper cargo ramp section 18 so that, during certain unloading operations, cargo pallets can be moved directly up to the cargo ramp terminating edge 253. In the embodiment of FIGS. 9 through 11, the removal of the sill bridge from the upper cargo ramp section 18 is facilitated by locking pins 268 which pass downwardly through the sill bridge hinge brackets to interconnect the sill bridge 252 with the hinge brackets. In addition in the embodiments of FIGS. 9 through 11, a tether cable 270, connected between the deployment fittings 183 and a stationary portion of the aircraft 14 can be included to ensure that the upper end of the cargo ramp 10 does not travel beyond the sill of the cargo opening during the deployment sequence.

Figure 13:
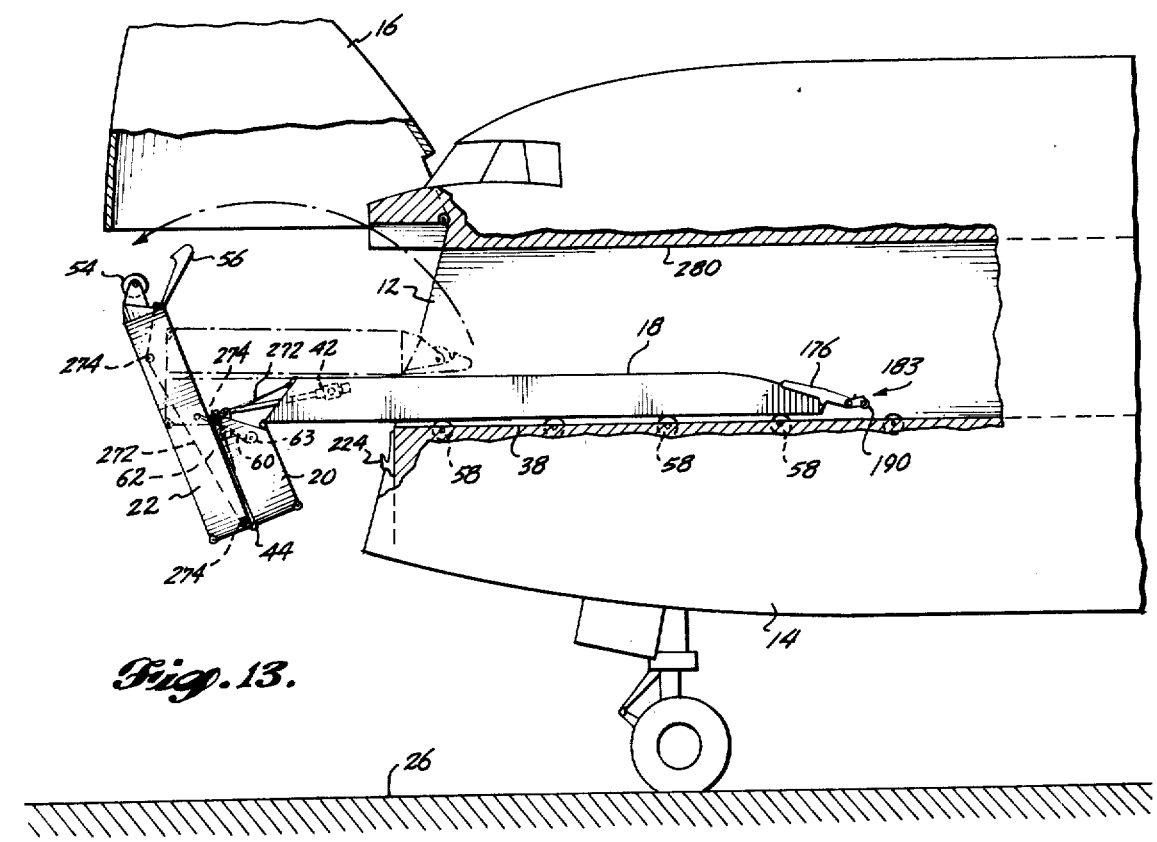

Keeping in mind the previously described structural features of the invention, the deployment and stowage of the cargo ramp 10 can be understood. Starting with the cargo ramp 10 in the previously described stowed condition of FIG. 2, deployment is effected by first moving the cargo ramp 10 outwardly through the cargo opening 12 and swinging the lower cargo ramp section 22 upwardly and outwardly about the hinges 40 between the upper cargo ramp section 18 and the second cargo ramp section 20 (FIG. 13). Generally, the cargo ramp 10 is moved outwardly by the powered cargo rollers 58 located in the cargo region floor 38. Such powered rollers are often included in aircraft configured for handling cargo. If rollers (either powered or nonpowered) are not included in the particular aircraft utilizing this invention, small rollers may be included along the lower edges of the upper cargo ramp section 18 and the second cargo ramp section 20 to facilitate the deployment and stowage of cargo ramp 10. In any case, as the cargo ramp 10 is moved outwardly through the cargo opening 12, the ball screw actuator 42 is activated to push the upper edge of the second cargo ramp section 20 away from the upper edge of the upper cargo ramp section 18. The linear translation of the ball screw actuator causes the lower ramp section 22 to swing upwardly away from the upper ramp section 18 about the hinges 40 which are located between the upper and second ramp sections (18 and 20 respectively). During this operation the lower ramp section 22 and the second ramp section 20 remain in the stowed position with the upper surface of the lower cargo ramp section 22 resting on the upper surface of the second ramp section 20.

As the ball screw actuator 42 swings the lower ramp section away from the stowed position of FIG. 2, the wheel covers 56 are pivoted upwardly about the wheel cover hinge by a cable 272 that is attached at one end to the terminating face of the upper cargo ramp section 18 and is attached at the other end to a lever-like projecting portion of the wheel covers 56. The cable 272 passes over a series of idler pulleys 274. The idler pulleys 274 route the cable through the interior region of the cargo ramp 10 such that the cable 272 is placed under tension as the ball screw actuator rotates the second cargo ramp section 20 away from the upper rampsection 18. The lowermost idler pulley (with respect to the deployed orientation of the cargo ramp 10) is mounted near the lower end of the lower cargo ramp section 22 such that when the cable 272 comes under tension the cable exerts a force on the lever like extension of the wheel cover 56 to pivot each wheel cover 56 upwardly.

Figure 14:
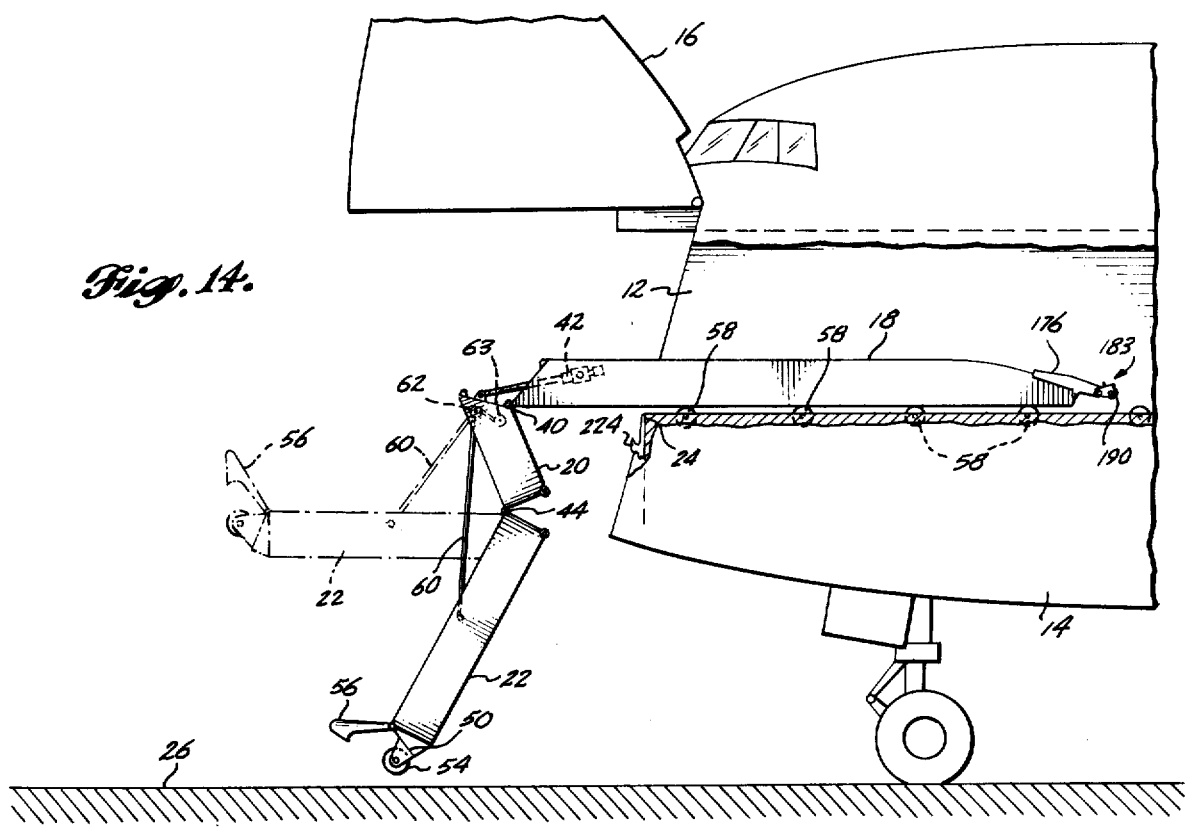
Figure 15:
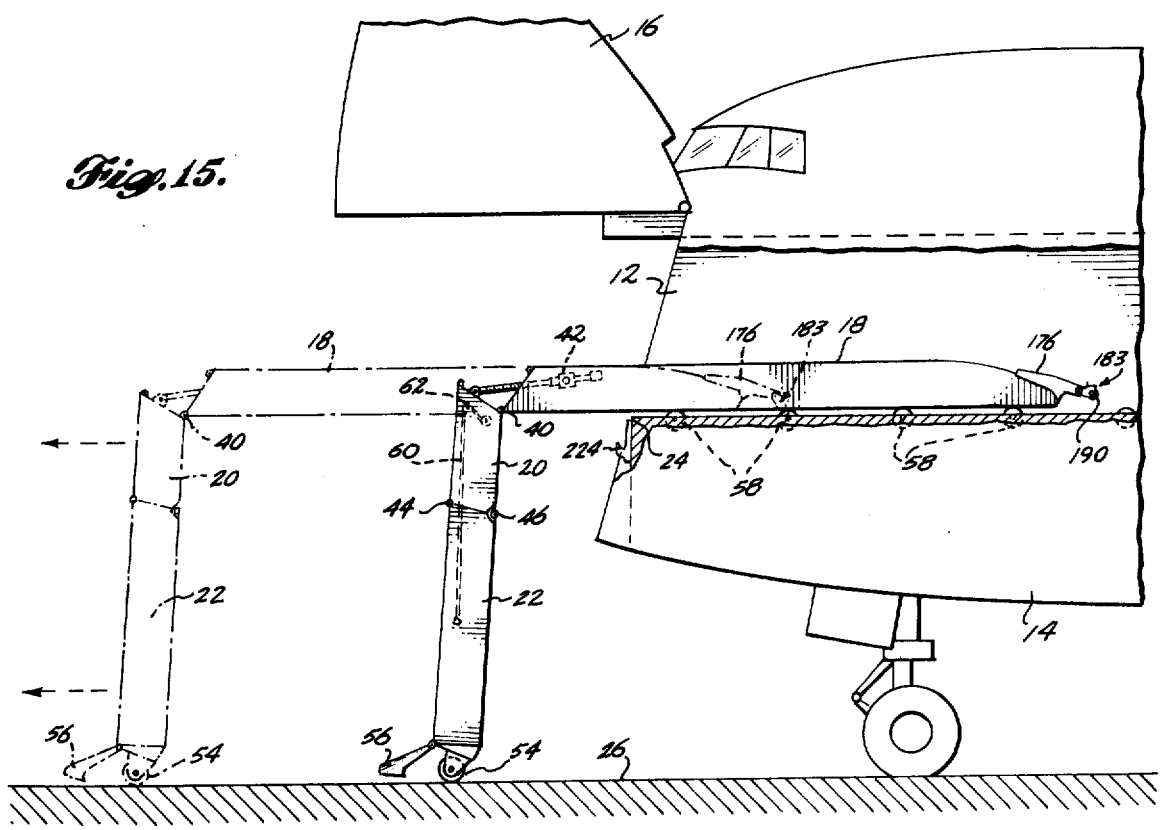

With the cargo ramp 10 partially deployed as described above and depicted by the solid lines of FIG. 13, the center of mass of the lower ramp section 22 lies outwardly from and above the hinges 44 that are located between the lower cargo ramp section 22 and the second cargo ramp section 20. At this point the previously described power actuated cable drive pulley 63 is activated to allow the lower ramp section 22 to pivot about the hinges 44. As shown in FIG. 14, as the cable drive pulley 63 is rotated to unwind the cable 60 from the drive pulley, the lower end of the lower ramp section 22 swings downwardly toward the surface of the ground 26. When the lower end of the cargo ramp is near the surface of the ground, the ball screw actuator 42 is employed, either simultaneously with the operation of the drive pulley 63 or in an alternating sequence, to swing the end faces of the upper and second cargo ramp sections (18 and 20, respectively) together. At this point in the deployment sequence, the second and lower cargo ramp sections (20 and 22, respectively) substantially extend vertically downward from the upper ramp section 18 with the wheels 54 either contacting the surface of the ground 26 or being slightly above the ground level (shown by the solid lines in FIG. 15). With the ramp in this position, the previously described locking mechanism 46 is activated to effectively join the second ramp section 20 and the lower ramp section 22 into a unitary ramp section.

Next the entire cargo ramp 10 is moved outwardly through the cargo opening 12 by utilizing the driven rollers 58 of the aircraft cargo handling system. During this outward movement the previously described guide rollers 212 (depicted in FIG. 12) maintain the cargo ramp 10 essentially centered in the aircraft. During this forward deployment of the cargo ramp 10, the wheels 54 are generally maintained in contact with the surface of the ground 26, with the ball screw actuator 42 being utilized to raise and lower the end of the cargo ramp, if necessary such that the cargo ramp smoothly traverses any inclinations, declinations or small obstacles on the ground.

The forward movement of the cargo ramp 10 is halted when the upper end of the cargo ramp 10 comes in alignment with the aft end of the guide channels 178 (FIGS. 9 and 12). This point of the deployment sequence is depicted by the phantom lines of FIG. 15. At this time, the deployment wheels 190 of the previously described deployment fittings 183 are engaged with the V-shaped channels of the guide channels 178 by moving the retaining latch 194 between the upper and lower retention notches 198 (FIG. 10). If necessary, the ball screw actuator 42 can be employed to slightly elevate the upper terminus of the cargo ramp 10 (by pivoting the cargo ramp section about the hinge 40 to raise the lower end of the cargo ramp) so that the deployment wheels 190 can be easily engaged with the grooved guide channels 178. With the deployment wheels 190 deployed downwardly in this manner, if necessary the ball screw actuator 42 is actuated to slightly elevate the outward end of the upper cargo ramp section 18, thereby placing the weight of the cargo ramp on the deployment wheels 190 and the ground wheels 54.

The cargo ramp 10 is then moved outwardly (generally by manual operation) until the deployment wheels 190 reach the forward terminus of the guide channels 178 (FIG 10). At this point of the deployment sequence (depicted by the phantom lines of FIG. 16), the upper terminus of the cargo ramp 10 extends outwardly over the cargo opening sill 24. The ball screw actuator 42 is then activated to swing the end faces of the upper and second cargo ramp sections (18 and 20) into alignment. As the ball screw actuator 42 is operated, the lower terminus of the cargo ramp moves outwardly on the ground wheels 54 and the cargo ramp upper terminus 253 pivots about the deployment wheels 190 to swing the previously described sill development fittings 183 (depicted in detail in FIGS. 9 and 10) toward the sill fittings 224. By sequential operation of the ball screw actuator 42 and the turn buckle 236, the safety stirrups 232 are engaged with the aircraft sill fittings 224. Once the safety stirrups 232 engage the sill fittings, the ball screw actuator 42 is activated to bring the ends of the upper and second ramp sections into alignment to thereby form an unitary ramp structure between the ground and the aircraft cargo opening (shown by the solid lines of FIG. 16). As the ball screw actuator 42 brings the upper and second ramp into alignment, the length of the wheel cover cable 272 (FIG. 13) effectively increases allowing the wheel covers 56 to pivot about the hinged wheel cover connection. With the cargo ramp 10 fully deployed, the wheel covers 56 effectively form an extension of the ramp track regions extending substantially from the lower ramp terminus to the surface of the ground 26 (FIG. 1).

The weight of the cargo ramp 10 is then shifted from the deployment wheels 190 to the aircraft sill fittings 224 by manually tightening the turn buckle 236 of the sill deployment fitting (FIG. 10) and the deployment wheels 190 are pivoted upwardly to disengage from the guide channels 178 by moving the retaining latch 194 between the lower and upper retention notches 198. With the cargo ramp 10 fully extended between the aircraft cargo opening and the surface of the ground, the sill bridge 252 is either swung forward to bridge the region between the cargo ramp upper terminus 253 and the forward most pallet 251 (FIGS. 1, 10 and 11), or if desired or necessary, the sill bridge 252 is removed by removing locking pins 268 (FIGS. 10 and 11). The cargo ramp 10 can then be adapted for the movement of either vehicular cargo or cargo on pallets by appropriately deploying or stowing the previously described guide rail and roller system. The cargo ramp 10 is moved from the deployment position depicted in FIG. 1 to the stowed position of FIG. 2 by essentially reversing the above-described deployment sequence.

Figure 16:
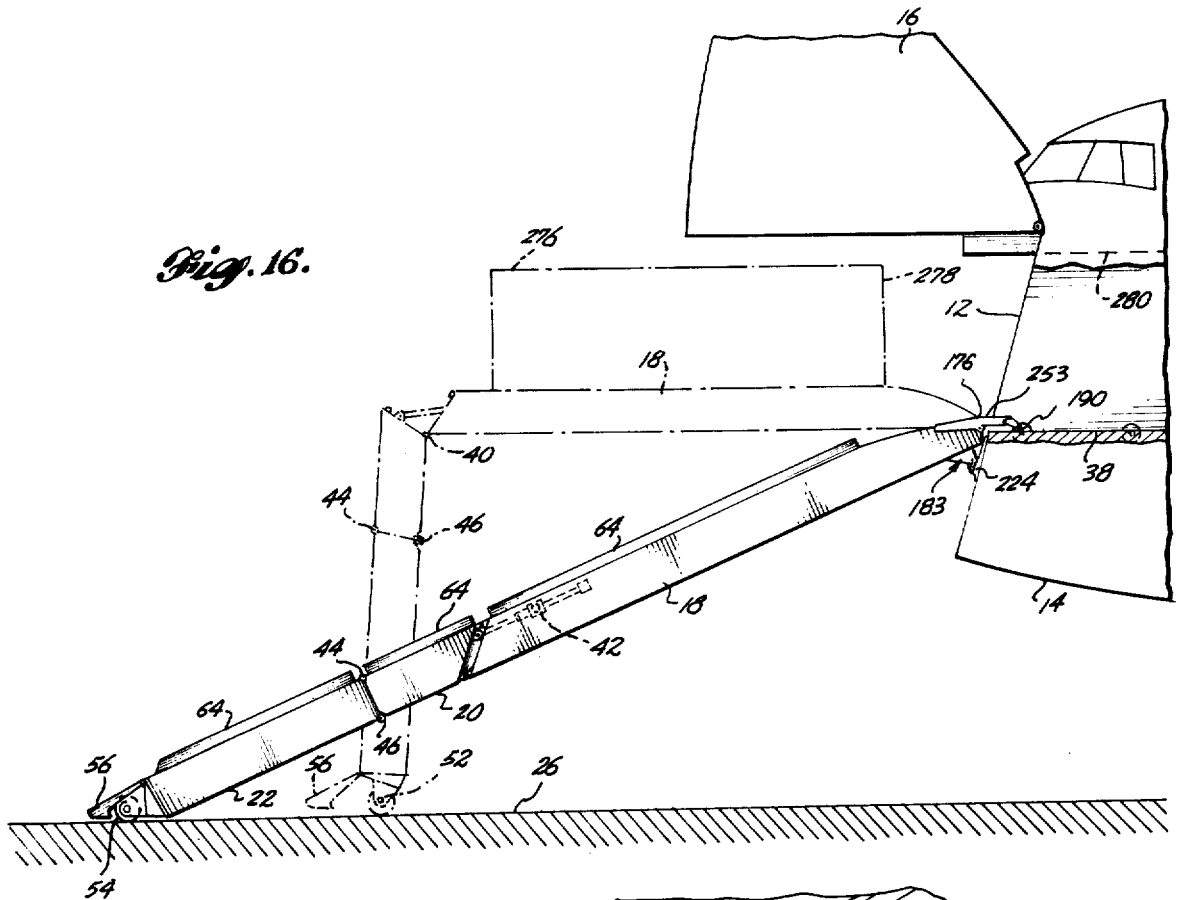
FIGS. 13-16 are partial elevation views illustrating the deployment sequence utilized to move the cargo ramp embodiment of FIG. 1 between the fully deployed position depicted in FIG. 1 and the stowed position depicted in FIG. 2; and, FIGS. 17-19 are elevation views of another cargo ramp embodiment of this invention illustrating the movement of the depicted embodiment between a stowed position and a deployed position.

Referring to FIG. 16 it can be seen that the cargo ramp of this invention can advantageously be utilized to load and unload cargo that could not be handled with a conventional cargo ramp. In FIG. 16 a cargo container or vehicle of rather substantial length is indicated by the phantom lines 276. As can be ascertained from FIG. 16, the length of the cargo 276 prevents the cargo from passing up the cargo ramp 10 and through the cargo opening 12 when the cargo ramp 10 is fully deployed since the forward edge 278 of the cargo will strike the cargo compartment ceiling 280 due to the inclined orientation between the upper surface of the deployed cargo ramp 10 and the cargo compartment floor 38. In the practice of this invention, the loading of such cargo can be effected by moving the cargo 276 up the cargo ramp 10 until the cargo is located on the upper cargo ramp section 18. The ball screw actuator 42 is then activated to hinge the cargo ramp 10 about the hinges 40 that are located between the upper and second cargo ramp sections (18 and 20). This hinging action elevates the outward end of the cargo 276 and when the upper cargo ramp section 18 is effectively parallel with the surface of the ground 26 (as shown by the phantom lines in FIG. 16), the cargo 276 can be moved directly through the cargo opening 12 and properly stowed within the aircraft. The unloading of such cargo is accomplished in a similar manner, with the ball screw actuator 42 utilized to position the upper cargo ramp section such that the cargo 276 can be moved through the cargo opening 12 and onto the upper ramp section 18. With the cargo on the upper ramp section, the ball screw actuator 42 is then actuated to deploy cargo ramp 10 to the position illustrated in FIG. 1 and the cargo can then be easily moved to the surface of the ground 26.

An embodiment of this invention utilizing two hinged together ramp sections rather than the three hinged together sections of the previously described embodiment is illustrated in FIGS. 17 through 19. Although such an embodiment requires more stowage space within the aircraft, a two sectioned embodiment can be advantageous in that it is structurally less complex than the previously described three section embodiment and can generally be constructed to bear the weight of heavier cargo such as very large vehicles, e.g. tanks and other military weapon systems.

Referring to FIG. 17, the aircraft 314 is configured in the same manner as the aircraft 14 which utilized the previously described cargo ramp embodiment and generally includes cargo rollers 358 mounted on the cargo compartment floor. Guide channels such as the guide channels 178 utilized with the previously described embodiment are also generally included in the aircraft 314 to aid in the deployment of the two section cargo ramp.

The cargo ramp 310 is comprised of an upper cargo ramp section 318 and a lower cargo ramp section 320 joined together by a hinge 340 located along the lower interfacing edges of the upper and lower cargo ramp sections. An actuator 342, such as the previously described ball screw actuator 42, is mounted within the upper cargo ramp section 318 and connected to the upper edge of the lower cargo ramp section 320 so that linear translation of the actuator 342 causes the upper and lower cargo ramp sections to fold or pivot about the hinge 340. In addition a sill deployment assembly 328, such as the deployment assembly 28 of the previously described embodiment, is attached to the upper end of the upper cargo ramp section 318 to aid in the deployment of the cargo ramp 310 and to secure the upper terminus of the cargo ramp to the sill of the aircraft opening in the manner described relative to the disclosed three section cargo ramp.

Wheel assemblies 348, which are arranged and function in the manner of the wheel assemblies 48 of the previously described embodiment, are attached to the lower ramp terminus. As in the case of the previously described three section embodiment of this invention, the wheel assemblies 348 include wheel covers 356 that are automatically deployed to form an extension of the cargo ramp 310 as the cargo ramp is deployed between the aircraft cargo opening 312 and the surface of the ground 326. In addition, the embodiment of FIGS. 17-19 may include the previously described guide rail and roller assemblies to facilitate the handling of cargo containers and cargo mounted on pallets.

As shown in FIG. 17, the two section cargo ramp 310 is stowed in the aircraft 314 in an extended position, i.e. the cargo ramp is not folded about a hinged axis as is the three sectioned cargo ramp embodiment. As illustrated in FIG. 18 by the phantom lines, deployment of the cargo ramp 310 is effected by moving the cargo ramp outwardly through the aircraft cargo opening 312 until the hinge connection 340 is located outwardly of the aircraft cargo opening still 324. This forward movement of the cargo ramp 310 is facilitated by the aircraft cargo rollers 358, in the same manner as described relative to the deployment of the three section cargo ramp.

The actuator 342 is then activated to swing lower cargo ramp section 320 downward until the wheels of the wheel assembly 348 contact the surface of the ground 326 (as shown by the solid lines of FIG. 18). As in the three sectioned ramp embodiment, a cable 372 which passes over idler pulleys 374 is routed through the interior of the cargo ramp 310 such that the wheel covers 356 automatically pivot upwardly as the actuator 342 swings the lower cargo ramp section 320 in a downward direction.

The cargo ramp 310 is then moved outwardly through the cargo opening 312 utilizing the aircraft cargo rollers 358, until the deployment wheel 390 of the deployment assembly 328 can be engaged with the guide channels that are mounted on the floor of the aircraft cargo compartment. With the deployment wheels engaged with the guide channels, the cargo ramp 310 is moved outwardly until the sill deployment assembly 328 extends over the cargo opening sill 324 (as shown by the phantom lines in FIG. 19). The ball screw actuator 342 is then activated bringing the upper and lower cargo ramp sections 318 and 320 into alignment to form a unitary ramp section. (As shown by the solid lines of FIG. 19). The sill deployment fitting 328 is engaged with the aircraft sill fittings as the ball screw actuator 342 lower the ramp into its final position in the previously described manner relative to the sill deployment fitting 180 of the three section cargo ramp embodiment. Stowage of the cargo ramp 310 within the aircraft 314 is effected by reversing the steps of the above-described deployment sequence.

What is claimed is:

1. An aircraft cargo ramp stowable in a first position within the cargo compartment of an aircraft and deployable to a second position wherein the upper terminus of the cargo ramp is attached to the sill region of a cargo opening in the fuselage of said aircraft and the lower terminus of said cargo ramp is supported by the ground comprising:

- at least two ramp sections having an upper surface including first and second track regions for supporting the weight of vehicular cargo said first and second track regions being separated by a recessed well region, said well region defining a substantially continuous trough longitudinally disposed along the central region of said cargo ramp when said cargo ramp is deployed in said second position;
- deployable guide rails longitudinally disposed along the outboard edges of said cargo ramp sections, said guide rails stowable in a position extending downwardly from said outboard edges of said cargo ramp, said guide rails deployable to extend upwardly along said outboard edges of said cargo ramp sections to project a predetermined distance beyond said upper surface of said ramp sections, said guide rails defining a first predetermined distance between those guide rails deployed along the opposite edges of said cargo ramp when said guide rails are deployed to project upwardly along said opposite outboard edges;
- a plurality of inboard and outboard rollers mounted at predetermined positions along the length of said cargo ramp, each of said outboard rollers pivotably attached to said guide rails, said outboard rollers stowable within the interior region of said guide rails and deployable to extend laterally across a portion of said first and second track regions, said inboard rollers pivotably attached to the boundaries defined by said first and second track regions and said well, said inboard rollers stowable along the wall of said well and deployable to extend across a portion of said first and second track regions;
- hinge means for serially connecting each of said ramp sections with one another;
- latching means for securely interconnecting said ramp sections into a unitary ramp structure when said cargo ramp is in said second position;
- actuator means for swinging said ramp sections about said hinge means during the deployment of said cargo ramp from said first position to said second position; and
- attachment means for detachably connecting said upper terminus of said cargo ramp to said aircraft sill region.

2. The aircraft cargo ramp of claim 1, wherein said guide rails are pivotable inwardly toward said recessed well region to define a second predetermined distance between said guide rails deployed along said opposite outboard edges of said cargo ramp sections.

3. The aircraft cargo ramp of claim 1, further including wheel means for supporting said cargo ramp on said ground when said cargo ramp is deployed from said first position to said second position, said wheel means mounted along said cargo ramp lower terminus.

4. The aircraft cargo ramp of claim 3, further comprising first and second wheel covers for defining an extension of said first and second track regions between said lower terminus of said cargo ramp and the surface of the ground when said cargo ramp is deployed in said second position, said first wheel cover connected to said lower terminus of said cargo ramp adjacent to said first track region, said second wheel cover connected to said lower terminus of said cargo ramp adjacent to said second track region.

5. An aircraft cargo ramp stowable within the cargo compartment of an aircraft and deployable between the cargo opening of said aircraft and the surface of the ground comprising:

- first, second and third cargo ramp sections, each of said cargo ramp sections having an upper surface, a lower surface, first and second end surfaces, and oppositely disposed side surfaces;
- first and second hinge means, said first hinge means for pivotably connecting said first end surface of said second cargo ramp section to said second end surface of said first cargo ramp section, said first hinge means mounted along said lower surfaces of said first and second cargo ramp sections, said second hinge means for pivotably connecting said first end surface of said third cargo ramp section to said second end surface of said second cargo ramp section, said second hinge means mounted along said upper surfaces of said second and third cargo ramp sections, said first and second cargo ramp sections being substantially aligned with one another when said cargo ramp is stowed in said cargo compartment with said third cargo ramp section being rotated about said second hinge means to place said upper surface of said third cargo ramp section in juxtaposition with said upper surface of said second cargo ramp section;
- first and second actuation means, for deploying said cargo ramp from the stowed position to a position in which said first, second and third cargo ramp sections are substantially aligned with one another and extend between the lower surface region of said cargo opening and said surface of the ground, said first actuation means for swinging said second and third cargo ramp sections about said first hinge means with said upper surfaces of said second and third cargo ramp sections in juxtaposition with one another, said second actuation for swinging said second and third cargo ramp sections about said second hinge means to substantially align said second and third cargo ramp sections with one another, said second actuation means being operable when said first actuator has positioned the center of mass of said third cargo ramp section outwardly from said second hinge means, said first actuation means further being operable to swing said aligned second and third cargo ramp sections about said first hinge means to bring said first cargo ramp section into substantial alignment with said aligned second and third cargo ramp sections; and
- means for attaching said first end surface of said first cargo ramp section adjacent to the sill region of said cargo opening when said cargo ramp is deployed from said aircraft cargo opening to said surface of the ground.

6. The aircraft cargo ramp of claim 5, further comprising deployment means mounted along said upper surface of said first cargo ramp section, said deployment means projecting beyond said first end surface of said first cargo ramp section, said deployment means including first and second wheels positionable to extend downwardly from said deployment means for engagement with first and second tracks mounted on the floor of said cargo compartment, said wheels and said tracks arranged to support said cargo ramp during portions of the sequence in which said cargo ramp is moved between the stowed position within said aircraft and the deployed position from said aircraft cargo opening to said surface of the ground wherein said cargo ramp is moved outwardly through said cargo opening, said wheels being positionable to extend upwardly to disengage said first and second tracks when said means for attaching said first end surface of said first cargo ramp section adjacent to said sill region of said cargo opening is utilized.

7. The aircraft cargo ramp of claim 6, wherein said deployment means includes first and second elongate deployment struts, said first and second deployment struts connected to said opposing side surfaces of said first cargo ramp section along said upper surface of said first cargo ramp section, said first and second deployment struts projecting beyond said first end surface of said first cargo ramp section, said first and second wheels of said deployment means respectively mounted to the projecting terminus of said first and second deployment struts, said first and second wheels swingable about said terminating portion of said first and second deployment struts to extend downward for engagement with said tracks mounted on said cargo compartment floor, said first and second wheels swingable upward to prevent contact of said wheels with said floor during stowage of said cargo ramp and during portions of the deployment of said cargo ramp.

8. The aircraft cargo ramp of claim 5, wherein said second end surface of said first ramp section includes an opening and said first actuation means includes an actuator for imparting a linear translation, said linear translation actuator extending through said opening in said second end of said first cargo ramp section, said linear translation actuator pivotably connected to said first cargo ramp section and pivotably connected to said first end surface of said second ramp section in close proximity to said upper surface of said second cargo ramp section, said linear translation actuator for swinging said cargo ramp section about said first hinge means by displacing the upper surface of said second cargo ramp section from said upper surface of said first cargo ramp section.

9. The aircraft cargo ramp of claim 5, wherein said second actuation means comprises:
   a cable having a first end connected at a position intermediate said first and second end surfaces of said third cargo ramp section; and
   a power driven pulley mounted proximate to said first end of said second cargo ramp section, said power driven pulley attached to the second end of said cable, said power driven pulley being reversible to wind and unwind said cable for swinging said third cargo ramp section about said second hinge means.

10. The aircraft cargo ramp of claim 5, further comprising a plurality of elongate guide rails, each of said guide rails mounted longitudinally along said oppositely disposed side surfaces of said first, second and third cargo ramp sections, said guide rails deployable to a first deployment position to project upwardly beyond said upper surface of said first, second and third cargo ramp sections, for defining a first predetermined cargo ramp width between oppositely disposed ones of said guide rails, said guide rails stowable to project downwardly along said oppositely disposed side walls of said first, second and third cargo ramp sections.

11. The aircraft cargo ramp of claim 10, wherein each of said guide rails is rotatable inwardly from said first guide rail deployment position to a second guide rail deployment position to define a second predetermined cargo ramp width between said oppositely disposed ones of said guide rails.

12. The aircraft cargo ramp of claim 10, further comprising:
   a first plurality of roller assemblies spaced along the length of said first, second and third cargo ramp sections and deployable to extend laterally across said upper surface of said cargo ramp sections for supporting cargo moved across said cargo ramp between said aircraft cargo opening and said surface of the ground when said cargo ramp is deployed in said second position.

13. The aircraft cargo ramp of claim 12 wherein said upper surface of said first, second and third cargo ramp sections includes a recessed well longitudinally disposed along the center of said first, second and third cargo ramp sections said wells of said first, second, and third cargo ramp sections being substantially aligned with one another to form a substantially continuous trough when said cargo ramp is deployed between said cargo opening and said surface of said ground, said well and said upper surface of said cargo ramp sections dimensioned to respectively define a first and second track region between said oppositely disposed side walls of said first, second and third cargo ramp sections and the longitudinal boundaries of said well, said first and second track regions for supporting vehicular cargo moved between said cargo ramp opening and said surface of the ground when said cargo ramp is deployed.

14. The aircraft cargo ramp of claim 13, wherein said first plurality of roller assemblies are spaced along each of said oppositely disposed side surfaces of said first, second and third cargo ramp sections for deployment across a portion of said first and second track regions, said cargo ramp further comprising a second plurality of roller assemblies spaced along the boundaries defined between said recessed well and said first and second track regions, said second plurality of rollers deployable to extend across a portion of said first and second track regions.

15. The aircraft cargo ramp of claim 14, wherein each guide rail of said plurality of guide rails includes a hollow interior region and each roller assembly of said first plurality of rollers is pivotable attached to one of said guide rails, each of said first plurality of roller assemblies swingable into the hollow interior region of the guide rail to which it is attached for stowage, said first plurality of roller assemblies swingable to extend across a portion of said first and second track regions.

16. The aircraft cargo ramp of claim 15, wherein each roller assembly of said second plurality of roller assemblies is pivotably attached to one of said boundaries between said recessed well and said first and second track regions, said second plurality of rollers swingable to extend downward into said recessed well for stowage, said second plurality of rollers swingable to extend across a portion of first and second track regions.

17. The aircraft crgo ramp of claim 13, further including wheel means for supporting said cargo ramp on said ground when said cargo ramp is deployed from said first position to said second position, said wheel means mounted along said second end surface of said third cargo ramp section.

18. The aircraft cargo ramp of claim 17, further comprising first and second wheel covers for defining an extension of said first and second track regions between said second end surface of said third cargo ramp section and the surface of the ground when said cargo ramp is deployed between said cargo opening and said surface to the ground, said first wheel cover connected to said second end surface of said third cargo ramp section adjacent to said first track region, said second wheel cover connected to said second end surface of said third cargo ramp section adjacent to said second track region.

19. The aircraft cargo ramp of claim 18, wherein said first and second wheel covers are pivotably connected to said second end surface of said third cargo ramp section, said cargo ramp further comprising cable means connected between said first and second wheel covers and said second end surface of said first cargo ramp section, said cable means routed through the interior of said cargo ramp for swinging said wheel covers upwardly toward said upper surface of said third cargo ramp section when said first actuation means swings said second ramp section about said first hinge means.

20. The aircraft cargo ramp of claim 5, further comprising power driven latching means for securely interconnecting said lower surfaces of said second and third cargo ramp sections, when said cargo ramp is deployed between the cargo opening of said aircraft and said surface of the ground.

21. The aircraft cargo ramp of claim 20, wherein said power driven latching means comprises:
- a first mounting plate having a generally rectangular base and first, second and third spaced apart support arms extending orthogonally from said rectangular base, said first and second support arms respectively positioned near a first and second end of said rectangular base, said third support arm centrally located between said first and second support arms, said mounting plate connected to one of said end surfaces of one of said second and third cargo ramp sections;
- first, second, third and fourth locking lugs, each of said locking lugs having a circular cross section and a predetermined length, said first and second locking lugs respectively extending inwardly from said first and second support arms toward said third support arm, said third and fourth locking lugs respectively extending outwardly from said third support arm toward said first and second support arms, each of said locking lugs substantially parallel to said base of said first mounting plate;
- a second mounting plate having a generally rectangular base and first and second support arms extending orthogonally from said rectangular base, said second mounting plate connected to the other of said end surfaces of the other of said second and third cargo ramp sections, said second mounting plate so arranged and so affixed to said cargo ramp section relative to the position of said first mounting plate so that said first support arm of said second mounting plate is positioned between said first and third locking lugs and said second support arm of said second mounting plate is positioned between said second and fourth locking lugs when said first end of said third cargo ramp section is swung adjacent to said second end of said second cargo ramp section by said second actuation means;
- first and second retaining assemblies respectively pivotably connected to said first and second support arms of said second mounting plate for engaging said first, second, third and fourth locking lugs, each of said first and second retaining assemblies including first and second C-shaped keepers positioned adjacent to the opposite sides of the respective first and second support arm for engaging said locking lugs when said first end of said third cargo ramp section is swung adjacent to said second end of said second cargo ramp section by said second actuation means, said C-shaped keepers rotatable about said locking lugs for latching said second and third cargo ramp sections to one another, said first and second retaining assemblies further including a circular external tooth gear concentrically mounted relative to said C-shaped keepers; and
- a drive shaft for rotating said C-shaped keepers, said drive shaft including a first and second drive gear concentrically mounted relative to said drive shaft, said first and second drive gears engaging with said external tooth gears of said first and second retaining assemblies, said drive shaft mounted for rotation between said first and second support arms of said second mounting plate.

22. The aircraft cargo ramp of claim 5, wherein said aircraft includes at least one sill fitting mounted in proximity with the sill region of said cargo opening for retaining the cargo door of said aircraft in a closed position and said means for attaching said first end surface of said first cargo ramp section adjacent to said sill of said aircraft opening comprises:
- a triangular shaped frame having a first apex pivotably attached to said first cargo ramp section, said frame dimensioned and mounted to said first cargo ramp section for swinging a second apex of said frame downwardly to engage said aircraft sill fitting;
- a U-shaped strap having the parallel legs thereof pivotably attached to said second apex of said frame, said strap rotatable about said second apex to engage said aircraft sill fitting; and
- a turnbuckle having a first end threadably connected to said first cargo ramp section and a second end threadably connected to the third apex of said frame, said turnbuckle for swinging said frame about said pivotably mounted first apex for engaging said aircraft sill fitting with said second apex of said frame.

23. An aircraft cargo ramp stowable in a first position within the cargo compartment of an aircraft and deployable to a second position wherein the upper terminus of the cargo ramp is attached to the sill region of a cargo opening in the fuselage of said aircraft and the lower terminus of said cargo ramp is supported by the ground comprising:
- at least two ramp sections having an upper surface including first and second track regions for supporting the weight of vehicular cargo;
- hinge means for serially connecting each of said ramp sections one with another;
- latching means for securely interconnecting said ramp sections into a unitary ramp structure when said cargo ramp is in said second position;
- actuator means for swinging said ramp sections about said hinge means during the deployment of said cargo ramp from said first position to said second position;
- attachment means for detachably connecting said upper terminus of said cargo ramp to said aircraft sill region;
- wheel means for supporting said cargo ramp on said ground when said cargo ramp is deployed from said first position to said second position, said wheel means mounted along said cargo ramp lower terminus;

first and second wheel covers for defining an extension of said first and second track regions between said lower terminus of said cargo ramp and the surface of the ground when said cargo ramp is deployed in said second position, said first wheel cover pivotably connected to said lower terminus of said cargo ramp adjacent to said first track region, said second wheel cover pivotably connected to said lower terminus of said cargo ramp adjacent to said second track region; and cable means connected between said first and second wheel covers and the uppermost one of said cargo ramp sections, said cable means routed through the interior of said cargo ramp to swing said wheel covers upwardly toward said cargo ramp lower terminus when said actuation means swings said ramp sections about said hinge means.

* * * * *